US012700698B2

(12) United States Patent
Plessis et al.

(10) Patent No.: US 12,700,698 B2
(45) Date of Patent: Aug. 4, 2026

(54) INLINE ELECTRICAL CONNECTOR SYSTEM

(71) Applicant: Molex, LLC, Lisle, IL (US)

(72) Inventors: Olivier Marcel Raymond Plessis, Guyancourt (FR); Matthieu Huguet, Montigny-le-Bretonneux (FR)

(73) Assignee: Molex, LLC, Lisle, IL (US)

( * ) Notice: Subject to any disclaimer, the term of this patent is extended or adjusted under 35 U.S.C. 154(b) by 376 days.

(21) Appl. No.: 18/292,927

(22) PCT Filed: Nov. 3, 2022

(86) PCT No.: PCT/IB2022/060618

§ 371 (c)(1),
(2) Date: Jan. 29, 2024

(87) PCT Pub. No.: WO2023/079496

PCT Pub. Date: May 11, 2023

(65) Prior Publication Data

US 2024/0339785 A1 Oct. 10, 2024

Related U.S. Application Data

(60) Provisional application No. 63/275,734, filed on Nov. 4, 2021.

(51) Int. Cl.
*H01R 13/631* (2006.01)

(52) U.S. Cl.
CPC .................................. *H01R 13/631* (2013.01)

(58) Field of Classification Search
CPC .................................................... H01R 13/631

(Continued)

(56) References Cited

U.S. PATENT DOCUMENTS 4,898,541 A * 2/1990 Lhuillier .............. H01R 13/629
439/376
5,295,756 A * 3/1994 Ohta .................. H01R 13/6215
439/364

(Continued)

FOREIGN PATENT DOCUMENTS

CN 107611698 A 1/2018
EP 3886266 A1 9/2021

(Continued)

OTHER PUBLICATIONS

Delphi, "ErgoMate", Retrieved from https://www.youtube.com/watch?v=oSn9A548EQk, dated Mar. 21, 2024, 1 page.

(Continued)

*Primary Examiner* — Gary F Paumen

(57) ABSTRACT

An inline electrical connector system includes male and female connectors and a mate assist slider. The male connector includes first and second spaced apart projections which engage with rotatable gears on the female connector, and the mate assist slider includes a gear track which engages with the gears. Axial movement of the female connector and mate assist slider relative to the male connector causes engagement of the first and second projections with the first and second gears, thereby causing the first and second gears to rotate relative to the gear track and draw the female connector and mate assist slider onto the male connector. A releasable connector position assurance device is provided on the mate assist slider to lock the components into a locked position.

22 Claims, 19 Drawing Sheets

(58) Field of Classification Search
USPC .......................................................... 439/296
See application file for complete search history.

(56) References Cited

U.S. PATENT DOCUMENTS

| | | | | |
|---|---|---|---|---|
| 5,496,186 | A | 3/1996 | Dobbelaere | |
| 5,529,510 | A * | 6/1996 | Wakata | H01R 13/2421 439/310 |
| 5,873,745 | A * | 2/1999 | Duclos | H01R 13/62944 439/372 |
| 7,241,155 | B2 * | 7/2007 | Tyler | H01R 13/62944 439/372 |
| 7,462,047 | B2 * | 12/2008 | Tyler | H01R 13/62938 439/372 |
| 7,597,569 | B2 | 10/2009 | Okuda | |
| 7,744,390 | B2 * | 6/2010 | Tyler | H01R 13/62944 439/372 |
| 8,747,130 | B2 * | 6/2014 | Tyler | H01R 13/62927 439/372 |
| 8,753,280 | B2 * | 6/2014 | Zhao | A61B 8/00 439/259 |
| 9,362,671 | B2 | 6/2016 | Vaccaro | |
| 9,780,487 | B1 | 10/2017 | Campbell | |
| 9,917,402 | B1 | 3/2018 | Campbell | |
| 10,109,952 | B2 | 10/2018 | Campbell | |
| 10,186,807 | B2 | 1/2019 | Campbell | |
| 10,608,375 | B2 | 3/2020 | Homme | |
| 10,840,641 | B2 | 11/2020 | Aoshima | |
| 11,489,286 | B2 * | 11/2022 | Menez | H01R 13/62922 |
| 2010/0227494 | A1 | 9/2010 | Tyler | |
| 2015/0222051 | A1 * | 8/2015 | Ikenaka | H01R 12/88 439/372 |

FOREIGN PATENT DOCUMENTS

| | | | |
|---|---|---|---|
| EP | 3706254 | B1 | 12/2023 |
| WO | 2013093546 | A1 | 6/2013 |

OTHER PUBLICATIONS

International Search Report and Written Opinion received for PCT Application No. PCT/IB2022/060618, mailed on Feb. 20, 2023, 8 pages.

* cited by examiner

INLINE ELECTRICAL CONNECTOR SYSTEM

RELATED APPLICATIONS

This application is a U.S. National Phase Patent Application of International Patent Application No. PCT/IB2022/060618, filed on Nov. 3, 2022, which claims priority to U.S. Provisional Application No. 63/275,734 filed Nov. 4, 2021, the disclosures of which is are incorporated herein by reference in their entireties.

FIELD OF THE DISCLOSURE

This disclosure generally relates to an inline electrical connector system, and more particularly relates to an inline electrical connector system with a mate assist slider.

DESCRIPTION OF RELATED ART

Mate assist sliders are known for use in inline electrical connector systems. The use of a mate assist sliders provide for a reduction of peak mating force between a female and male connector. Examples of such electrical connector systems are provided in U.S. Pat. Nos. 9,917,402B1 and 9,780,487B1. These patents disclose an axial mate assist system that utilizes an axially mounted involute curved non-circular gear on the female connector. The gear has a variable pitch radius which provides high mechanical advantage when the connector system components are experiencing their highest mating forces which reduces the peak mating force during mating of the female connector with the male connector.

Since only a single axially mounted gear is provided, the connector system can experience tilting during engagement of the female connector with the male connector which can cause alignment issues during the mating of the electrical terminals within the male and female connectors. Therefore, improvements in such systems are desirable.

BRIEF DESCRIPTION OF THE DRAWINGS

The present disclosure is illustrated by way of example, and not limited, in the accompanying figures in which like reference numerals indicate similar elements and in which:

FIG. 3 depicts a perspective view of the electrical connector system in a mated position:

FIG. 4 depicts a top plan view of the electrical connector system in the mated position of FIG. 3:

DETAILED DESCRIPTION

Figure 1:
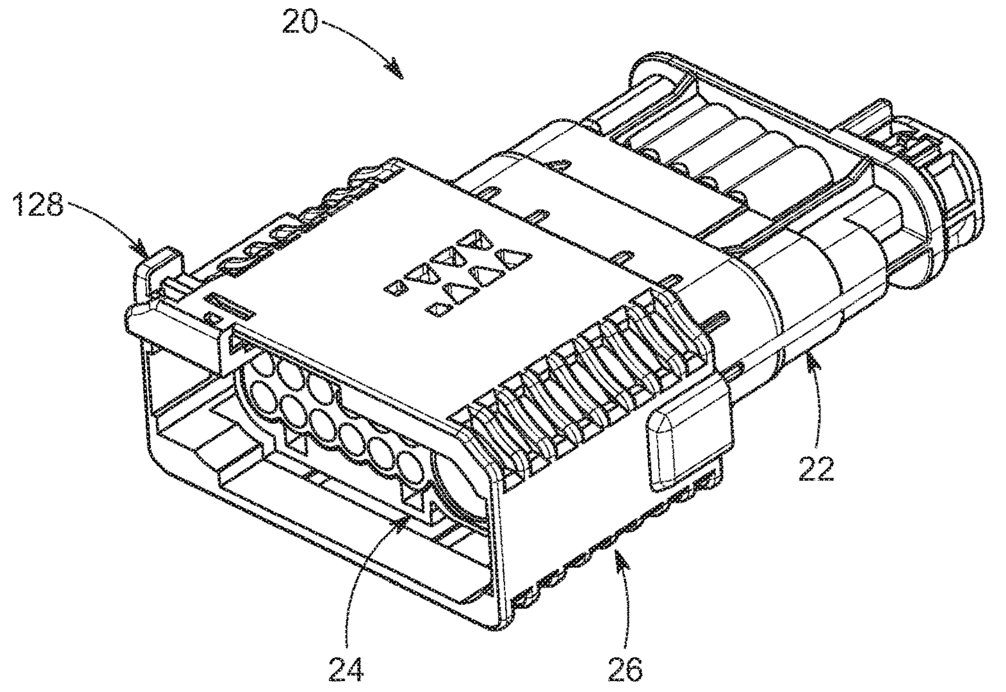
FIG. 1 depicts a perspective view of an electrical connector system which includes a male connector, a female connector, a mate assist slider and a perimeter seal, and which shows the male connector and the female connector in a partially mated position.

While the disclosure may be susceptible to embodiment in different forms, there is shown in the drawings, and herein will be described in detail, specific embodiments with the understanding that the present disclosure is to be considered an exemplification of the principles of the disclosure and is not intended to limit the disclosure to that as illustrated and described herein. Therefore, unless otherwise noted, features disclosed herein may be combined to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

The present disclosure is illustrated by way of example, and not limited, in the accompanying figures in which like reference numerals indicate similar elements and in which, the appended figures illustrate features of embodiments of an inline electrical connector system.

Figure 2:
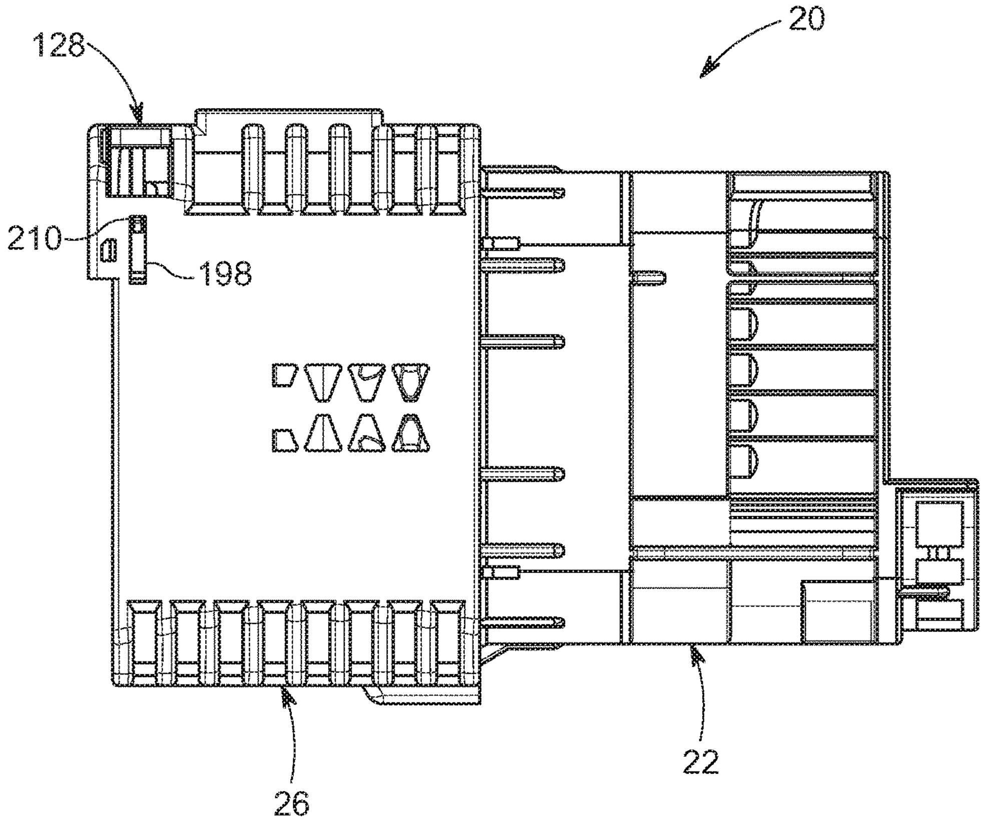
FIG. 2 depicts a top plan view of the electrical connector system of FIG. 1.
Figure 3:
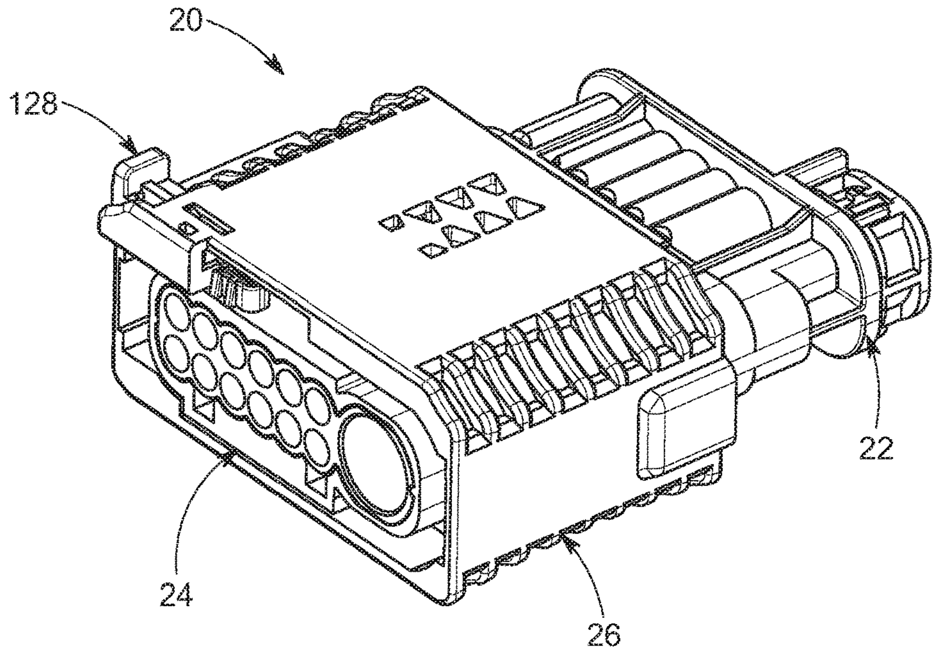
FIG. 3 depicts a perspective view of the electrical connector system in a partially mated position.
Figure 4:
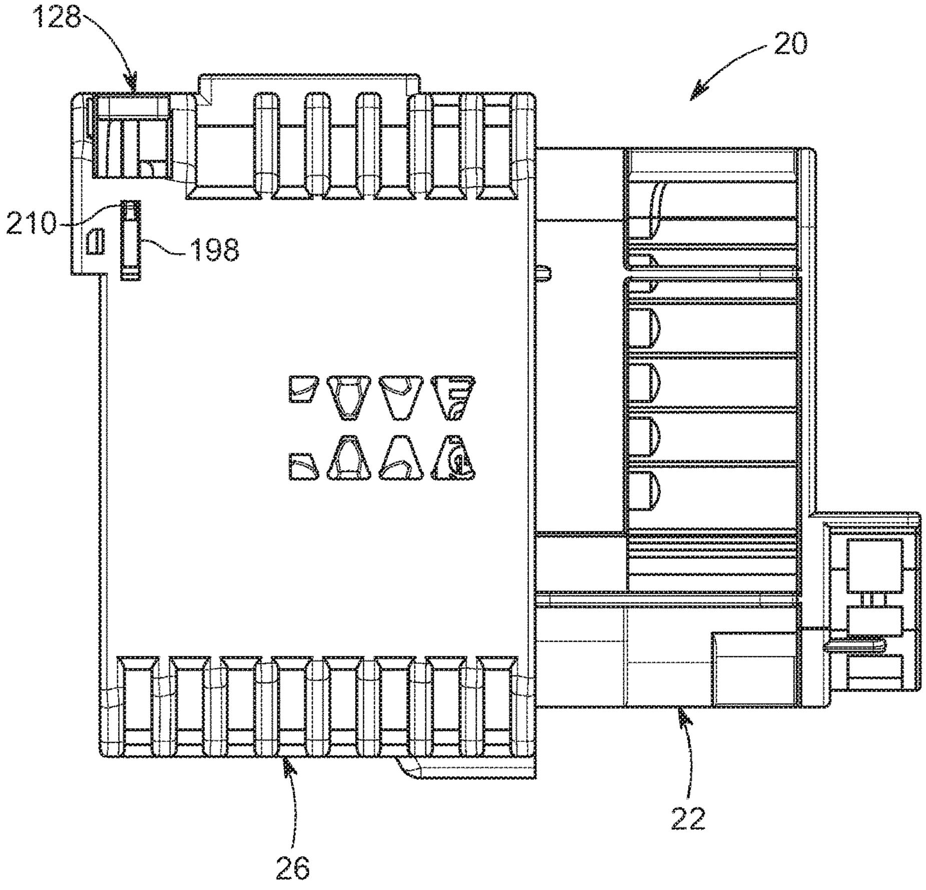
FIG. 4 depicts a top plan view of the electrical connector system in the partially mated position of FIG. 3.
Figure 5:
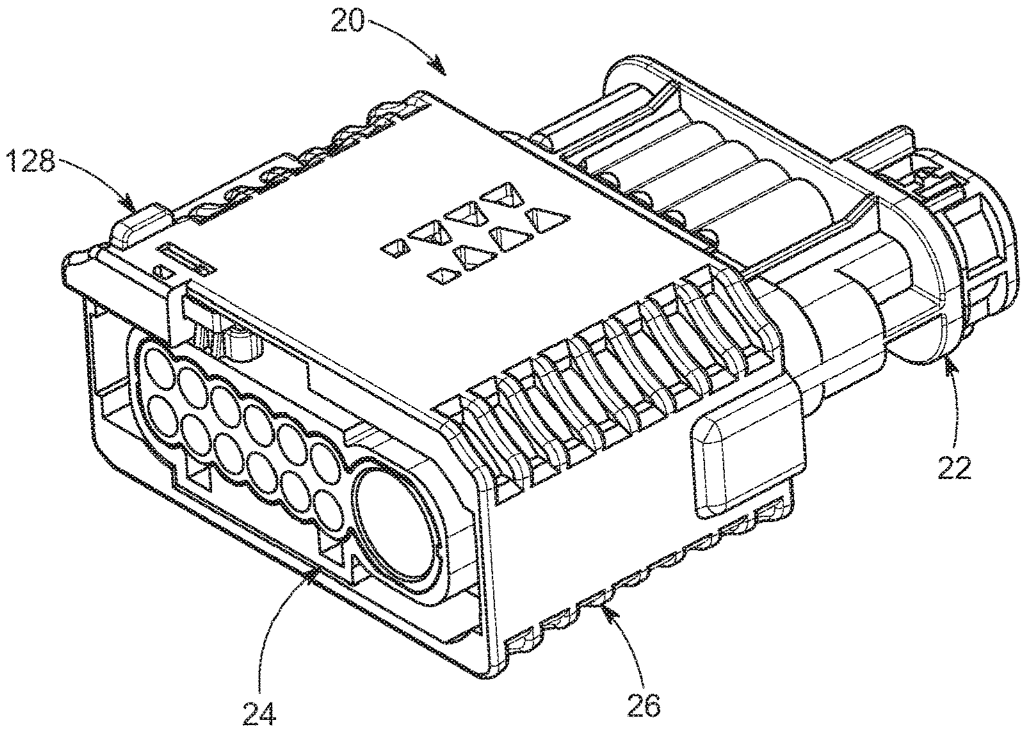
FIG. 5 depicts a perspective view of the electrical connector system in a mated and locked position.
Figure 6:
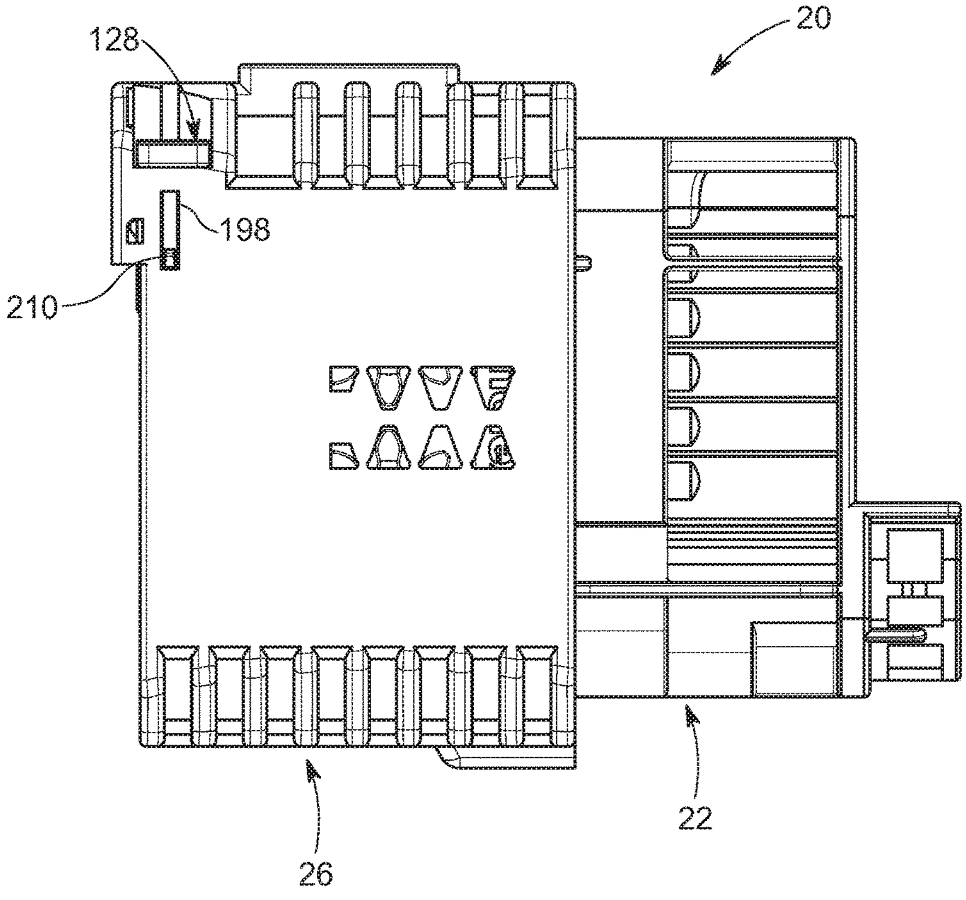
FIG. 6 depicts a top plan view of the electrical connector system in the mated and locked position of FIG. 5.

FIGS. 1-8 illustrate an inline electrical connector system 20 which includes a male connector 22, a female connector 24, a mate assist slider 26 and a perimeter seal 28. The male connector 22 and the female connector 24 are configured to removably mate together, and the perimeter seal 28 seals the connection between the male connector 22 and the female connector 24. The male connector 22 and the female connector 24 mate together along an axial direction. The male and female connectors 22, 24 includes features which provide for an anti-tilt and stable mating between the male and female connectors 22, 24. The female connector 24 seats within the mate assist slider 26 and the mate assist slider 26 can be slid axially relative to the female connector 24. FIGS. 1 and 2 illustrate the electrical connector system 20 in partially mated position. FIGS. 3 and 4 illustrate the electrical connector system 20 in mated position. FIGS. 5 and 6 illustrate the electrical connector system 20 in mated and locked position.

Figure 7:
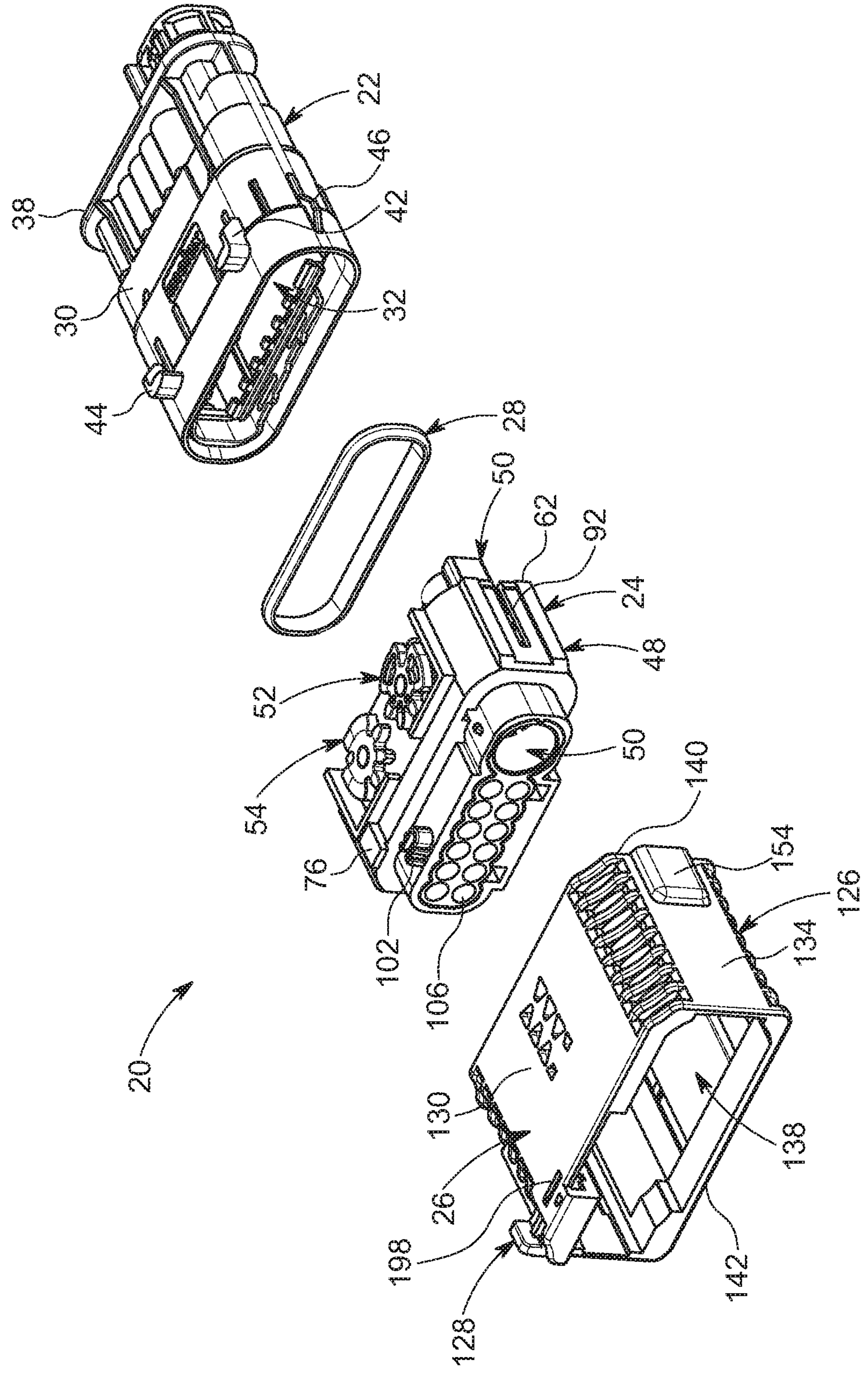
FIGS. 7 and 8 depict exploded perspective views of the electrical connector system.
Figure 8:
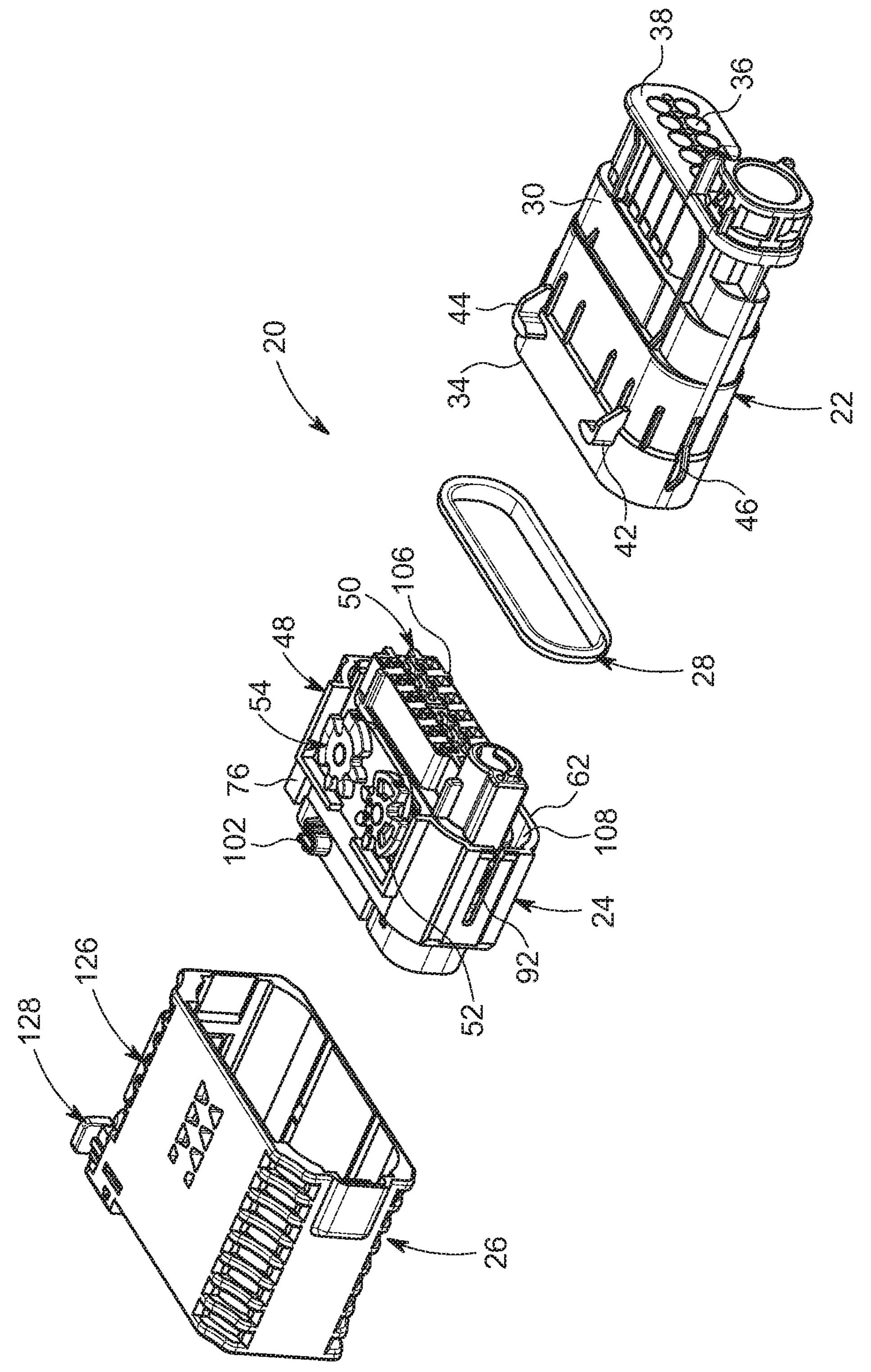
Figure 9:
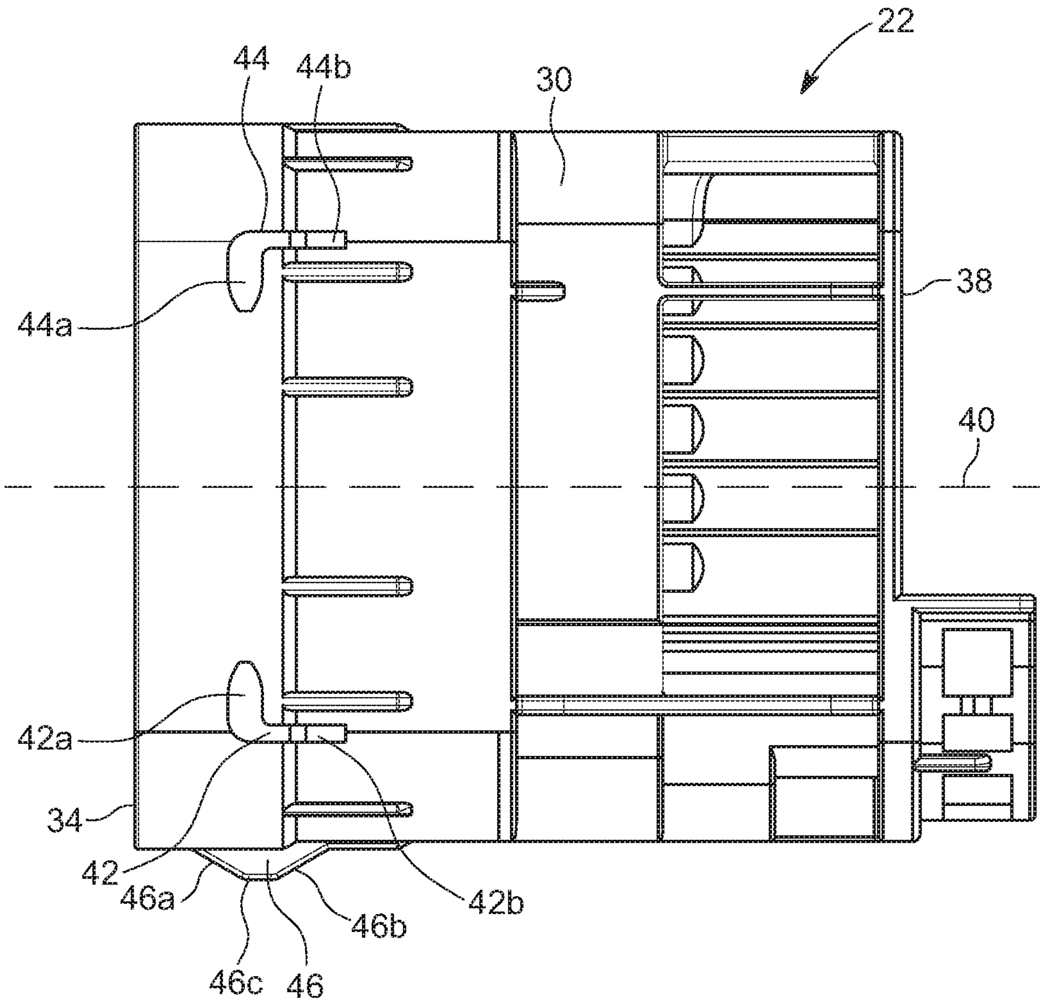
FIG. 9 depicts a top plan view of the male connector.

As shown in FIGS. 7-9, the male connector 22 has a housing 30 having an upper surface, a lower surface and side surfaces connecting the upper and lower surfaces together. A cavity 32 extends from a front end 34 of the housing 30 to a plurality of passageways 36 that extend from the cavity 32 to a rear end 38 of the housing 30. The cavity 32 forms an upper wall portion of the housing 30, a lower wall portion of the housing 30, and side wall portions of the housing 30 connecting the upper and lower wall portions together. Multiple electrical terminals (not shown) are positioned within the passageways 36 that may attach to a wire bundle (not shown) that may connect to wire harness or other electrical components. The passageways 36 which house the electrical terminals are not symmetrical about an axial axis 40 of the male connector 22. First and second L-shaped projections 42, 44 extend upwardly from the upper surface of the upper wall portion above the cavity 32 and proximate to, but spaced from, the front end 34. As shown in FIG. 9, each projection 42, 44 has a first portion 42*a*, 44*a* that is perpendicular to the axial axis 40 and a second portion 42*b*, 44*b* that is parallel to the axial axis 40. The projections 42, 44 are equally spaced from the axial axis 40. A protuberance 46 extends outward from the side surface proximate to, but spaced from, the front end 34. The protuberance 46 has an angled front surface 46*a*, an angled rear surface 46*b*, and a flat surface 46*c* connecting the front and rear surfaces 46*a*, 46*b*. The flat surface 46*c* is parallel to the axial axis 40. The protuberance 46 is axially spaced from the front end 34 approximately the same distance that the projections 42, 44 are spaced from the front end 34.

As shown in FIGS. 10-13, the female connector 24 includes an outer housing portion 48, an inner housing portion 50 seated within the outer housing portion 48, and a pair of gears 52, 54 rotatably coupled to the outer housing portion 48.

The outer housing portion 48 has a front portion 56 and a rear portion 58 having passageway 60 that extends from a front end 62 of the outer housing portion 48 to a rear end 64 of the outer housing portion 48.

The front portion 56 has an upper wall 66, a lower wall 68, and opposite side walls 70, 72 connecting the upper and lower walls 66, 68. The front portion 56 is enlarged relative to the rear portion 58 such that the walls 66, 68, 70, 72 of the front portion 56 form a shoulder 74 at the rear end of the front portion 56. A projecting wall portion 76 extends rearwardly from the front portion 56 and partially overlaps the rear portion 58, but is spaced above the rear portion 58. The upper wall 66 has first and second spaced apart slots 78, 80, see FIGS. 10 and 12, extending axially from the front end 62. The slots 78, 80 are equally spaced from an axial axis 82 of the female connector 24 and are spaced apart from each other the same distance that the first and second projections 42, 44 are spaced apart so that the first projection 42 is received in the first slot 78 when the female connector 24 is mated to the male connector 22 and so that the second projection 44 is received in the second slot 80 when the female connector 24 is mated to the male connector 22. A front wall portion 84 of the front portion 56 is defined between the slots 78, 80. First and second spaced apart pins 86, 88 extend upwardly from the front wall portion 84 and are equally spaced from the axial axis 82. The pins 86, 88 are spaced the same distance from the front end 62. The side wall 70 of the front portion 56 has a recess 90 extending axially from the shoulder 74 at a rear end thereof, and a slot 92 extending axially from the front end 62 at the midpoint of the recess 90. A pair of protuberances 94 are formed at the front end of the recess 90 on opposite sides of the slot 92.

Figure 11:
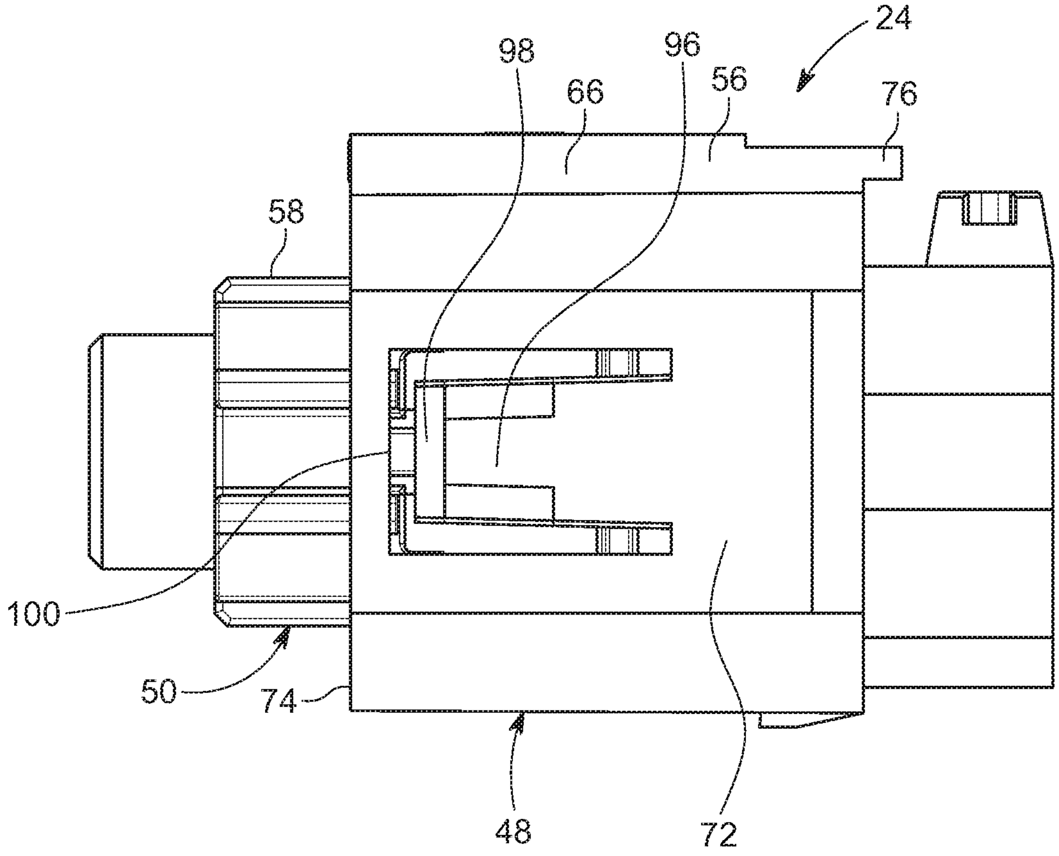
FIG. 11 depicts a side elevation view of the female connector.

As shown in FIG. 11, the side wall 72 has a depressible finger 96 having a free end 98 which can be engaged by a user. The free end 98 is spaced from a wall surface 100 of the side wall 72. The depressible finger 96 can be depressed into the passageway 60.

Figure 10:
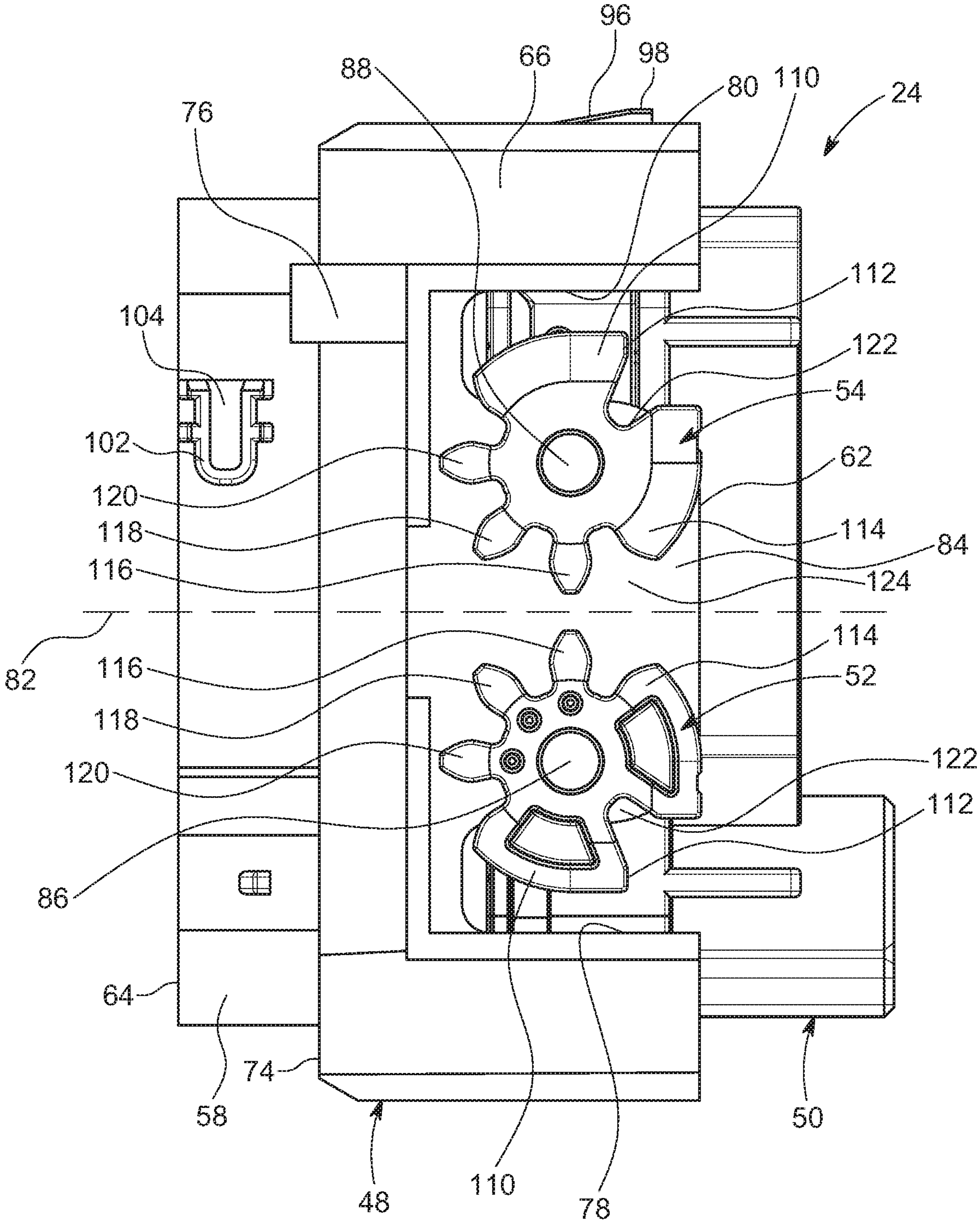
FIG. 10 depicts a top plan view of the female connector.
Figure 12:
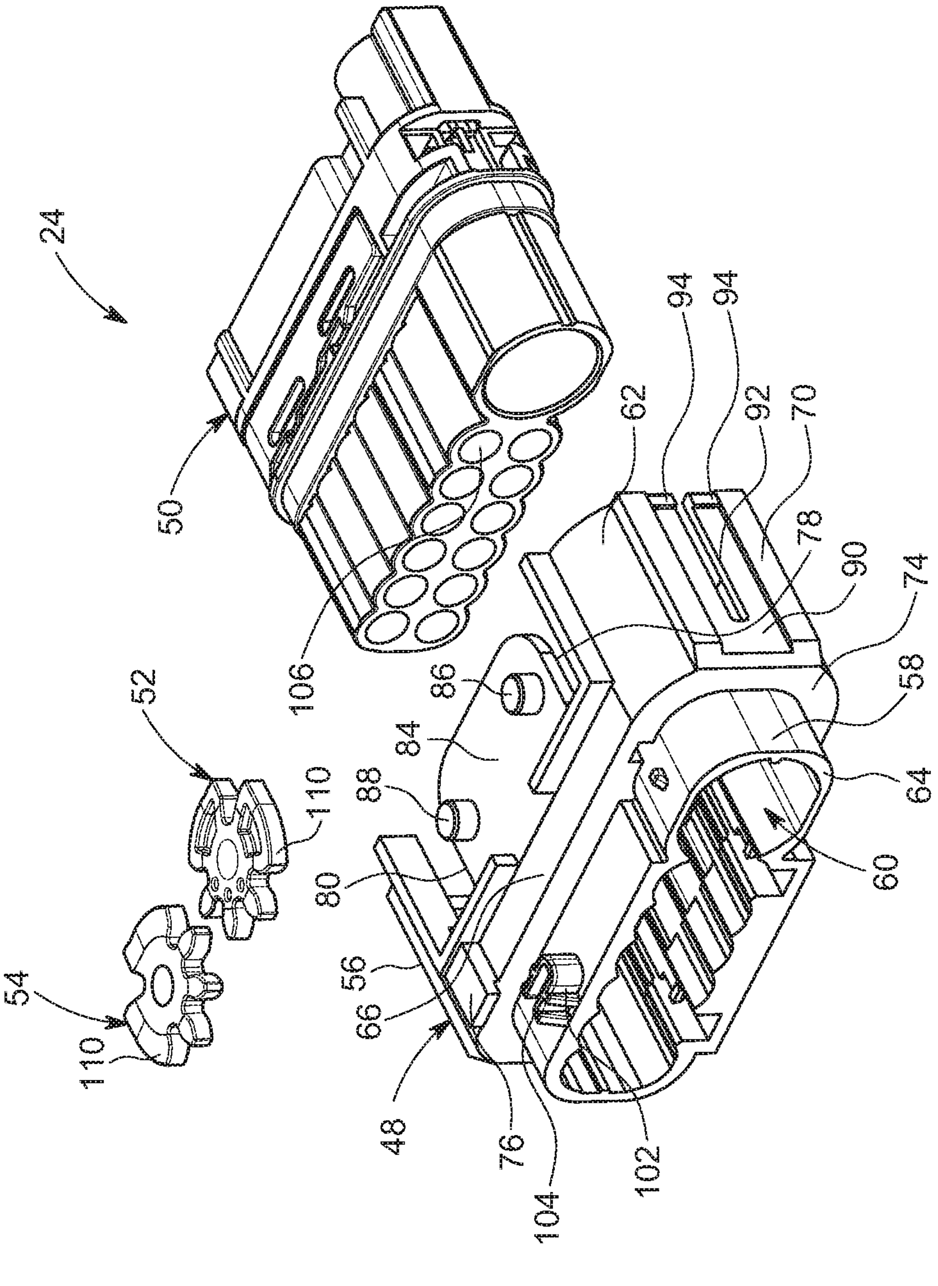
FIGS. 12 and 13 depict exploded perspective views of the female connector.
Figure 13:
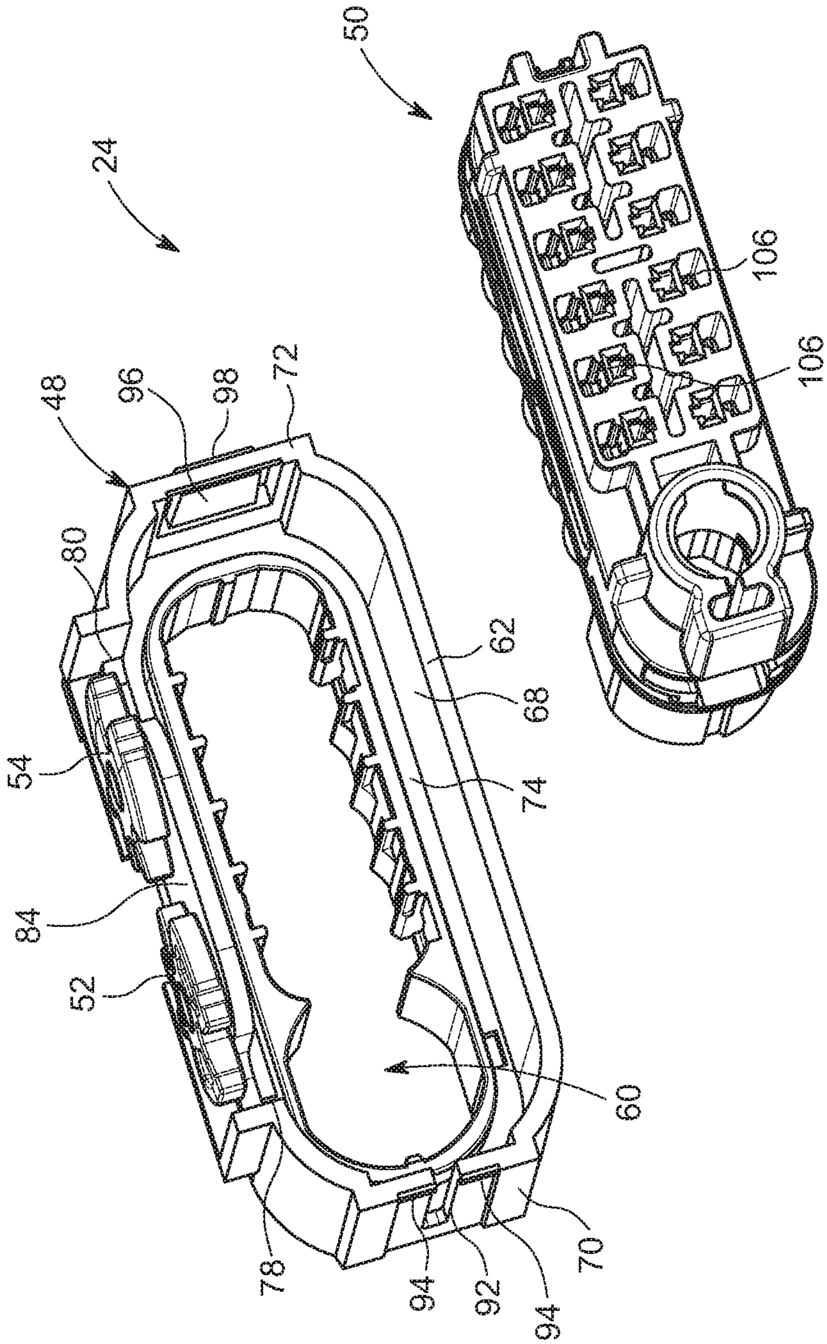

The rear portion 58 has an upper wall, a lower wall, and opposite side walls connecting the upper and lower walls together. As shown in FIGS. 10 and 12, a U-shaped protrusion 102 having an open end 104 is formed on the upper wall of the rear portion 58. The open end 104 faces away from the axial axis 82.

The inner housing portion 50 is formed from wall having an upper surface, a lower surface, side surfaces connecting the upper and lower surfaces together. A plurality of passageways 106 extend from a front end of the wall to a rear end thereof. The inner housing portion 50 seats with the passageway 60 and projects forward and outward of the front end 62 of the outer housing portion 48. When the inner housing portion 50 is seated within the outer housing portion 48, a recess 108, see FIG. 8, is formed therebetween that extends from the front end 62 of the outer housing portion 48 to the shoulder 74. The perimeter seal 28 seats around the inner housing portion 50 and abuts against the inside of the shoulder 74. Multiple electrical terminals (not shown) are provided in the passageways 106 and are configured to mate with the electrical terminals of the male connector 22. The electrical terminals of the female connector 24 may attach to a wire bundle that may connect to wire harness or other electrical components (not shown). The passageways 106 of the female connector 24 which house the electrical terminals mirror the passageways 60 of the male connector 22 such that the passageways 106 are not symmetrical about the axial axis 82 of the female connector 24.

As best shown in FIG. 10, each gear 52, 54 has a first enlarged tooth 110 having a cam surface 112 thereon, a second enlarged tooth 114 proximate to the first enlarged tooth 110, and a plurality of gear teeth 116, 118, 120 that extend partially around the circumference of the gear 52, 54 and between the first and second enlarged teeth 110, 114. A valley 122 is formed between the cam surface 112 and the second enlarged tooth 114. Gear 52 is mounted on pin 86 and can spin freely thereon, and gear 54 is mounted on pin 88 and can spin freely thereon. The pins 86, 88 thus defines an axis of rotation of the gears 52, 54. The gears 52, 54 are spaced apart from each other such that a pathway 124 is provided therebetween and which overlaps the front wall portion 84.

The mate assist slider 26 includes a shroud 126 and a connector position assurance device 128 attached thereto. The female connector 24 seats within the mate assist slider 26 and the mate assist slider 26 can be slid axially relative to the female connector 24 when unlocked. The connector position assurance device 128 provides for the secure coupling of the male and female connector 22, 24. The connector position assurance device 128 can only activated when the mate assist slider 26 is moved relative to the female connector 24. The male connector 22, the female connector 24 and the mate assist slider 26 are locked in position by the connector position assurance device 128. The connector position assurance device 128 can be released from engagement with the female connector 24 to allow the disengagement of the female connector 24 from the male connector 22.

As shown in FIGS. 14-18, the shroud 126 has an upper wall 130, a lower wall 132, and opposite side walls 134, 136 connecting the upper and lower walls 130, 132 together. The walls 130, 132, 134, 136 form a passageway 138 that extends from a front end 140 of the mate assist slider 26 to a rear end 142 thereof.

Figure 14:
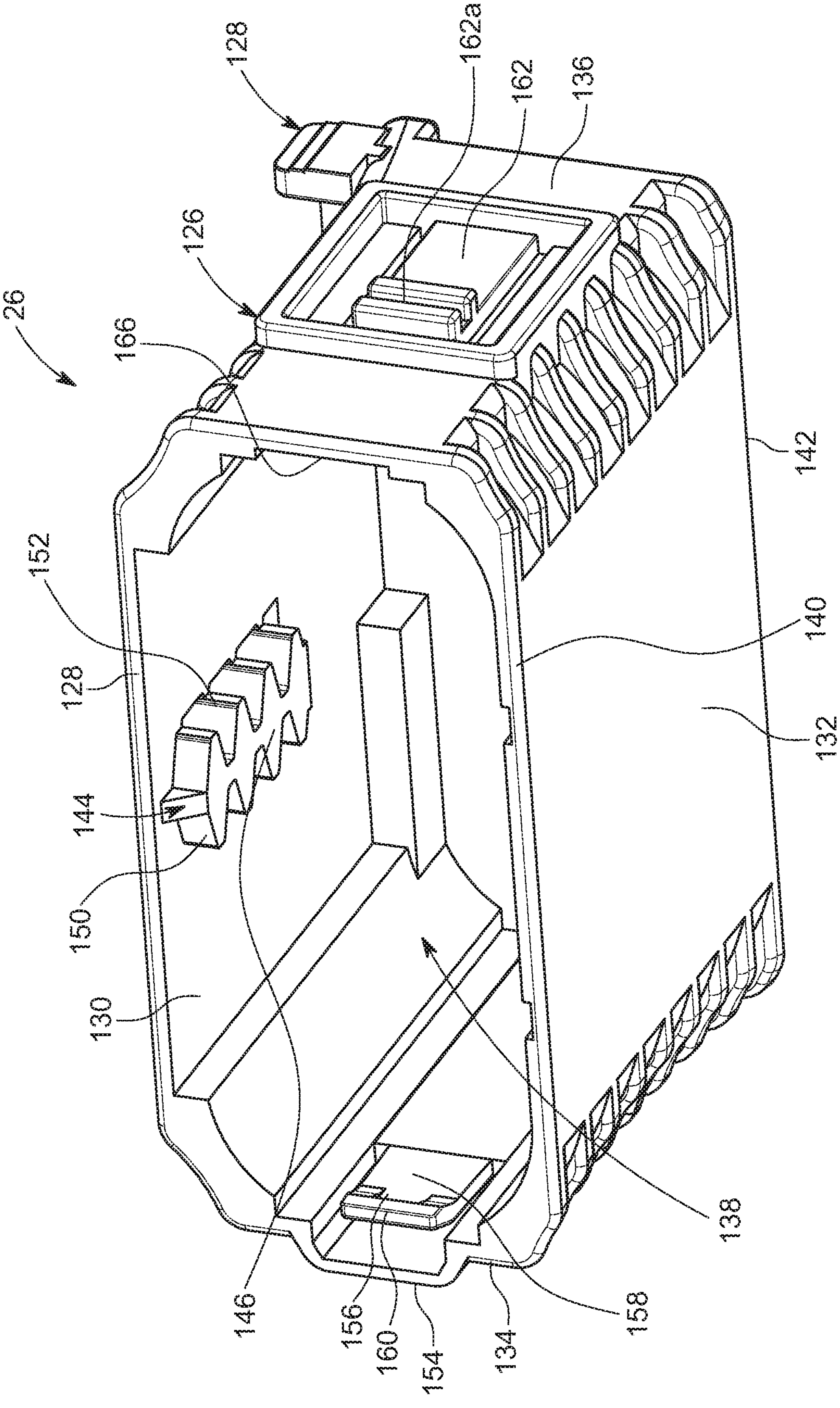
FIG. 14 depicts a perspective view of the mate assist slider.
Figure 15:
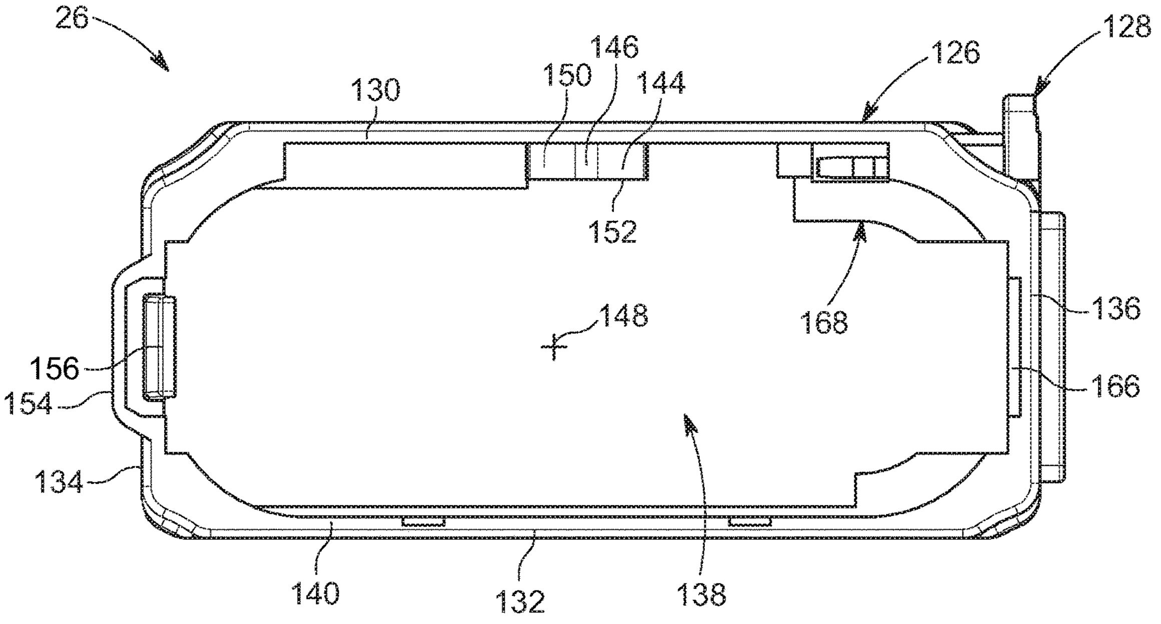
FIG. 15 depicts an end elevation view of the mate assist slider.
Figure 18:
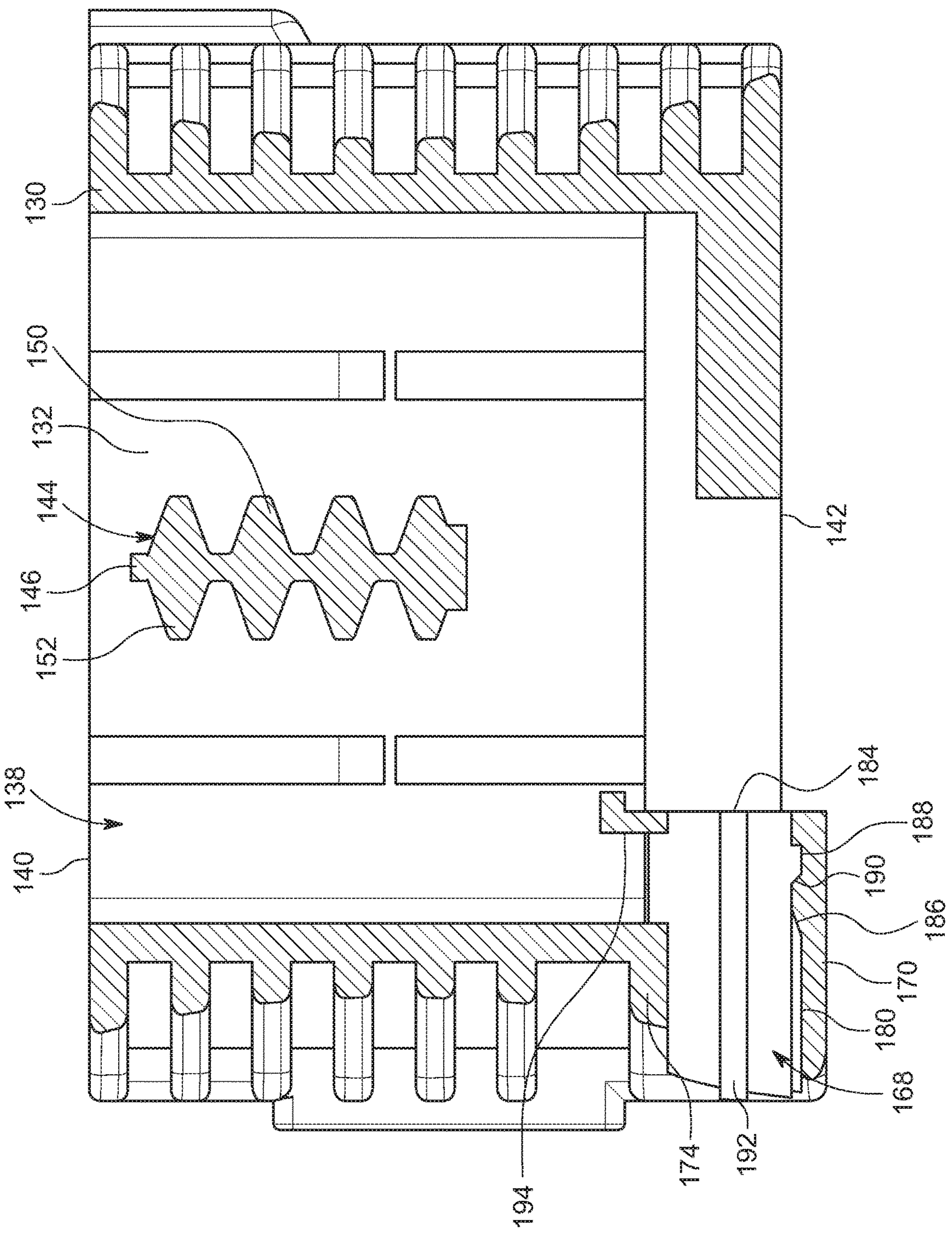
FIG. 18 depicts a cross-sectional view of the mate assist slider along line 18-18 of FIG. 15.

A gear track 144, see FIGS. 14 and 18, is formed along a lower surface of the upper wall 130. The gear track 144 has a central spine 146 that extends axially along an axial axis 148 of the mate assist slider 26, a first plurality of rack teeth 150 extending outward from the central spine 146 on a first side thereof, and a second plurality of rack teeth 152 extending outward from the central spine 146 on a second side thereof. The female connector 22 seats within the passageway 138 and engages the gear track 144 as described herein.

The side wall 134 has an outer wall portion 154 forming a pocket extending from the front end 140, and a flexible finger 156 extending from a rear end of the outer wall portion 154 toward the front end 140. The flexible finger 156 has a body portion 158 which extends from the rear end of the outer wall portion 154 and an angled head portion 160 at the front end thereof. The flexible finger 156 can flex relative to the outer wall portion 154. The side wall 136 has a depressible latch 162, see FIGS. 14 and 16, extending toward the front end 140 which is positioned within a three-sided window in the side wall 136 of the shroud 126. The three-sided window has a front wall surface 164. The depressible latch 162 has a finger engaging portion 162*a* at a free end thereof which can be engaged by a user to depress the latch 162 into the three-sided window. A pocket 166 is provided on the interior of the side wall 136 forwardly of the finger engaging portion 162*a*.

Figure 16:
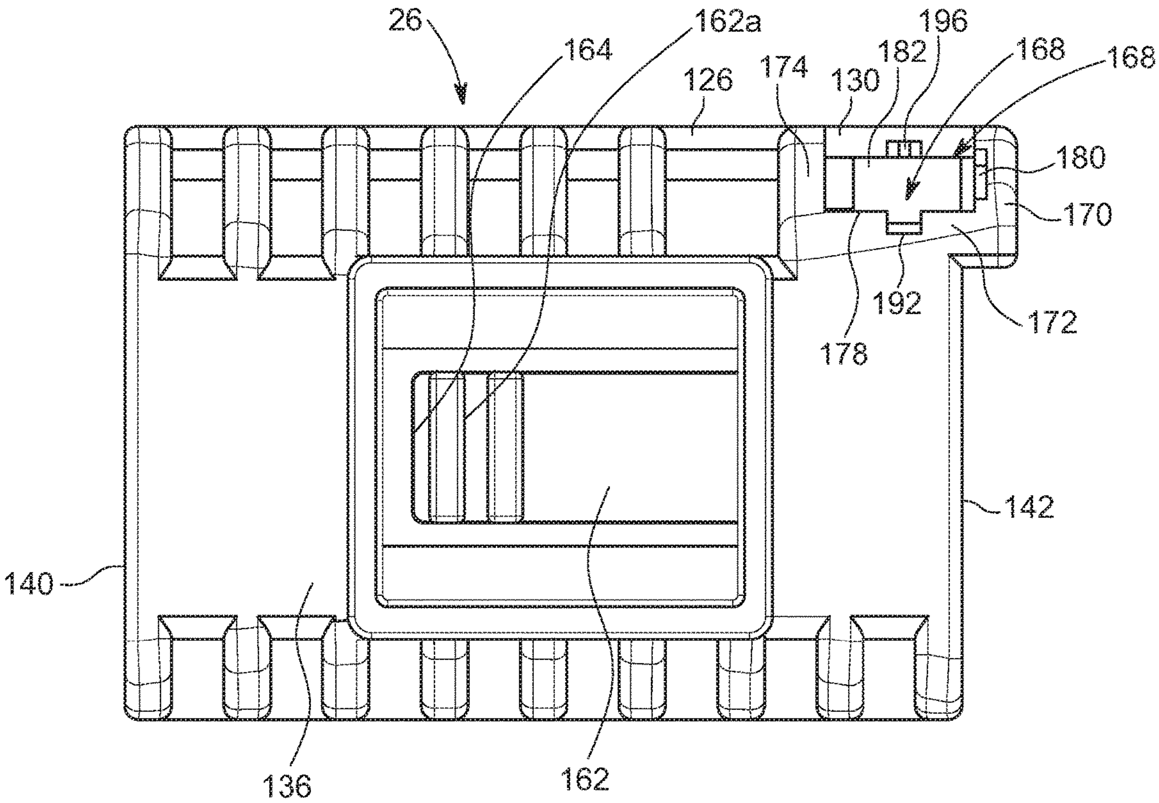
FIG. 16 depicts a side elevation view of the mate assist slider.
Figure 17:
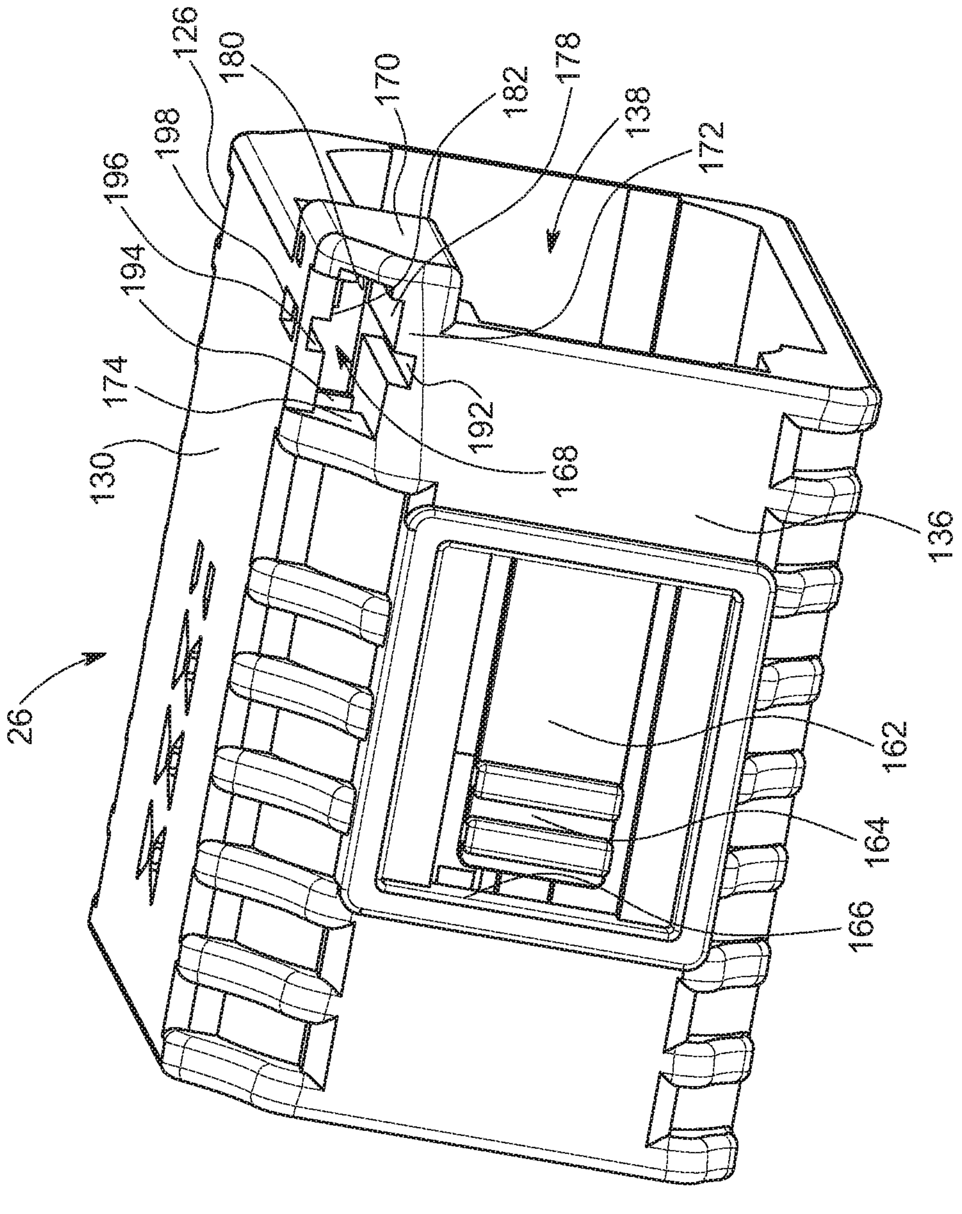
FIG. 17 depicts an alternate perspective view of the mate assist slider.

As shown in FIGS. 16-18, a passageway 168 in the shroud 126 into which the connector position assurance device 128 seats is formed by a rear wall 170 extending downward from the upper wall 130 at the rear end of the shroud 126 and inwardly from the side wall 136, a lower wall 172 extending forward from a lower end of the rear wall 170, a front wall 174 extending downward from the upper wall 130 at a front end of the lower wall 170, and the portion of the upper wall 130 thereabove. The passageway 168 is open on both ends and is transverse to the axial axis 82. The end of the upper wall 130 above the passageway 168 is inward of the end of the lower wall 172 such that a seat wall portion 178 of the lower wall 172 is formed when viewed from above the shroud 126. A first slot 180 is provided in the rear wall 170 and extends from an opening 182 at the outer end of the passageway 168 and toward an opening 184 at the inner end of the passageway 168 in a direction transverse to the axial axis 82. The opening 184 is in communication with the passageway 138 through the shroud 126. The first slot 180 does not extend the entire width of the rear wall 170 and ends in an angled end wall 186. A recess 188 is provided in the rear wall 170 spaced from the end of the slot 180 and has an angled end wall 190 which is proximate to, but spaced from, the angled end wall 186. A second slot 192 is provided in the lower wall 172 and extends from the opening 182 to the opening 184 in a direction transverse to the axial axis 82. An opening 194 is provided in the front wall 174 at a position spaced from the opening 184. The opening 194 is in communication with the passageway 138 through the shroud 126. A third slot 196 is provided in the upper wall 130 above the passageway 168 and extends from the opening 182 toward the opening 184, but does not intersect the opening 184. An elongated opening 198 is provided through the upper wall 130 above the third slot 196. The slots 192, 196 are vertically aligned.

Figure 19:
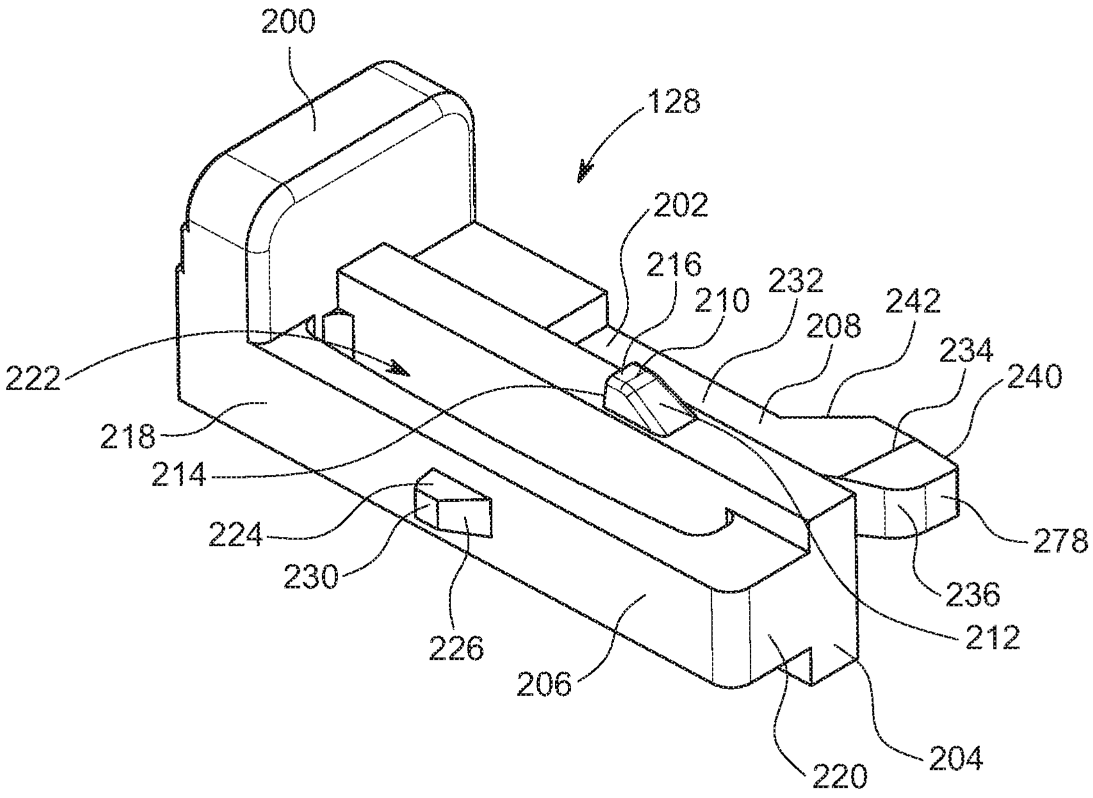
FIG. 19 depicts a perspective view of a connector position assurance device of the mate assist slider.
Figure 20:
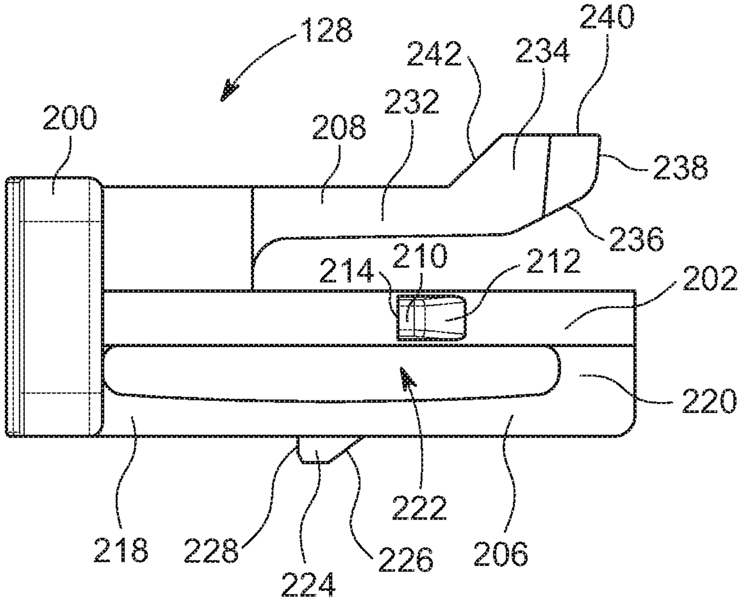
FIG. 20 depicts a side elevation view of the connector position assurance device.

As shown in FIGS. 19 and 20, the connector position assurance device 128 has a finger engaging portion 200, an elongated central spine 202 having a key 204 extending downwardly therefrom, a first deflectable arm portion 206, and a second deflectable arm portion 208. The central spine 202 extends from the midpoint of the finger engaging portion 200 in a first direction. A first barb 210 extends upward from the central spine 202 at a position that is spaced from the finger engaging portion 200. The first barb 210 has an angled wall 212 extending up from the central spine 202, a straight wall 214 extending vertically from the central spine 202, and a top wall 216 extending parallel to the central spine 202. The angled wall 212 is farther away from the finger engaging portion 200 than the vertical wall 214. The key 204 may further extend along the bottom of the finger engaging portion 200. The key 204 has a width which is less than the width of the finger engaging portion 200. The first deflectable arm portion 206 has an elongated first section 218 extending from the finger engaging portion 200 on one side of the central spine 202 and which in an undeflected condition is parallel to the central spine 202, and a second section 220 which extends from an end of the first section 218 to the end of the central spine 202. An opening 222 is formed between the first deflectable arm portion 206 and the central spine 202. A second barb 224 extends from the first section 218 in a direction opposite to the central spine 202. The second barb 224 has an angled wall 226 extending from the first section 218, a straight wall 228 extending perpendicular from the first section 218, and a wall 230 extending parallel to the first section 218. The angled wall 226 is farther away from the finger engaging portion 200 than the straight wall 228. The second deflectable arm portion 208 has an elongated first section 232 extending from the finger engaging portion 200 on the other side of the central spine 202 and which in an undeflected condition is parallel to the central spine 202, and a second section 234 which extends from an end of the first section 232. The second section 234 is enlarged and offset to one side of the first section 232. The second section 234 has a first surface 236 extending from the end of the first section 232 at an angle, a second surface 238 extending from the first surface 236 and which is perpendicular to the first section 232, a third surface 240 extending from the second surface 238 and which is parallel to the first section 232, and a fourth surface 242 extending at an angle between the third surface 240 and the first section 232. The finger engaging portion 200 extends upward from the central spine 202 and the arm portions 206, 208. The first barb 210 is further away from the finger engaging portion 200 than the second barb 224. The second section 234 of the second deflectable arm portion 208 is further away from the finger engaging portion 200 than the first barb 210. The key 204 seats within the second slot 192 of the passageway 168 of the mate assist slider 26.

The shroud 126 of the mate assist slider 26 surrounds the outer housing portion 48 of the female connector 24 and can slide axially relative thereto as described herein. When the mate assist slider 26 is in a mate position with the female connector 24 as shown in FIGS. 1, 2, 21 and 22, the gear track 144 of the mate assist slider 26 is within the pathway 124 and the rack teeth 150, 152 of the mate assist slider 26 are engaged with the teeth 116 of the gears 52, 54 of the female connector 24. The first rack teeth 150 are engaged with the tooth 116 of the gear 52 and the first two rack teeth 152 are engaged with the tooth 116 of the gear 54. The U-shaped protrusion 102 of the female connector 24 is forward of the front wall 174 of the passageway 168 of the mate assist slider 26. The first barb 210 of the connector position assurance device 128 is within the elongated opening 198 of the mate assist slider 26 at the end proximate to the side wall 136, the second barb 224 of the connector position assurance device 128 is within the first slot 180 of the mate assist slider 26, and the second section 234 of the second deflectable arm portion 208 of the connector position assurance device 128 is within the opening 194 of the mate assist slider 26. The finger engaging portion 200 of the connector position assurance device 128 is positioned on top of the seat wall portion 178 and does not extend outwardly from the seat wall portion 178. As a result, a more compact package is provided by the electrical connector system 20. The recess 188 of the mate assist slider 26 is unoccupied. The free end 98 of the depressible finger 96 of the female connector 24 is within the pocket 166 of the shroud 126 of the mate assist slider 26. The finger engaging portion 162*a* of the depressible latch 162 of the mate assist slider 26 is proximate to the depressible finger 96, but spaced from the free end 98. The angled head portion 160 of the flexible finger 156 of the mate assist slider 26 abuts against the protuberances 94 of the female connector 24. The projecting wall portion 76 of the female connector 24 is spaced from the second section 234 of the second deflectable arm portion 208 of the connector position assurance device 128. In this mate position, the mate assist slider 26 cannot slide axially relative to the female connector 24 because the engagement of the finger 96 with the pocket 166, and the engagement of the finger 156 with the protuberances 94 provides cooperating lock features that must be overcome prior to movement of the mate assist slider 26 relative to the female connector 24. Other cooperating lock features are within the scope of the disclosure.

Figure 21:
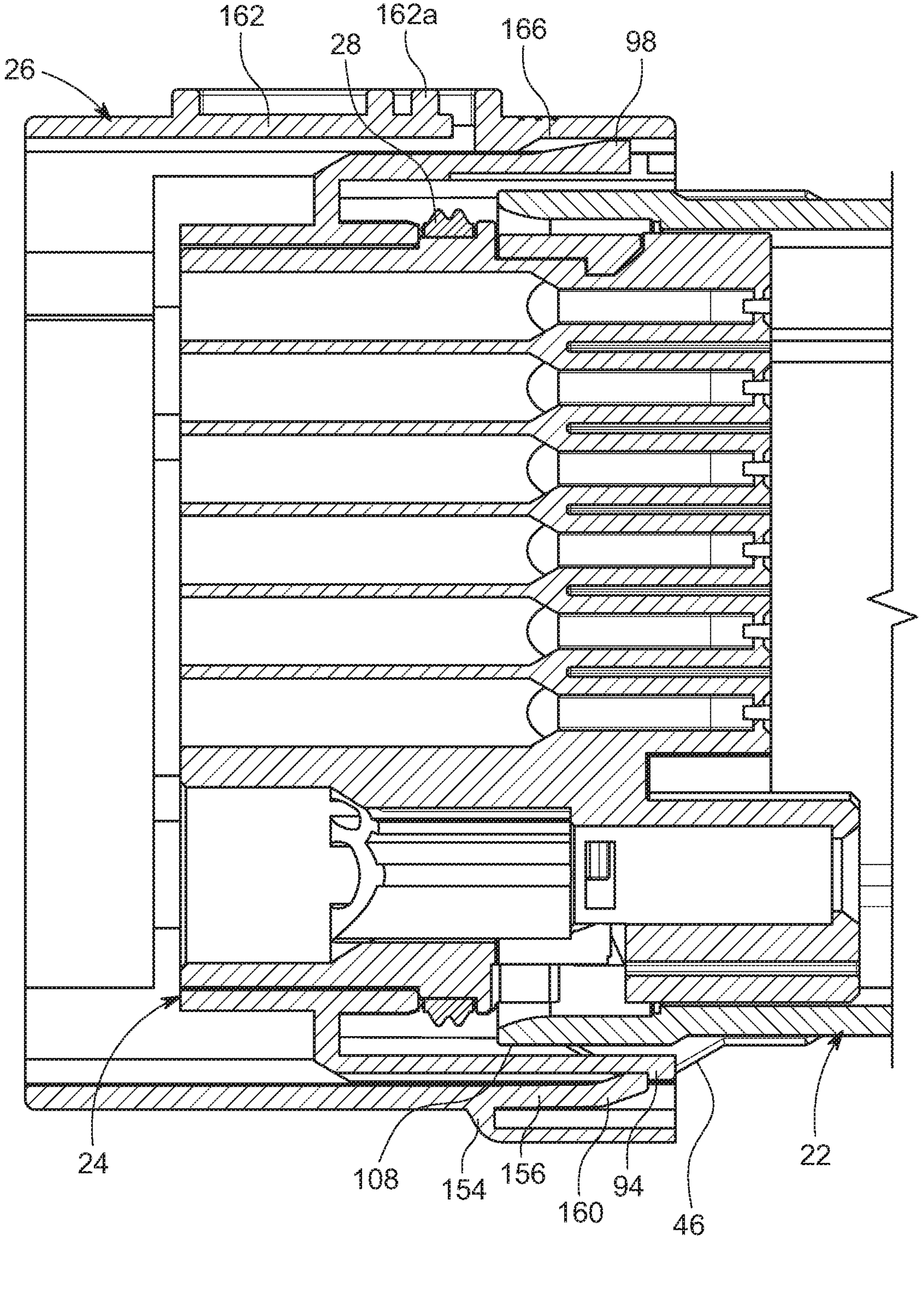
FIG. 21 depicts a cross-sectional view of the electrical connector system along line 21-21 of FIG. 1.
Figure 22:
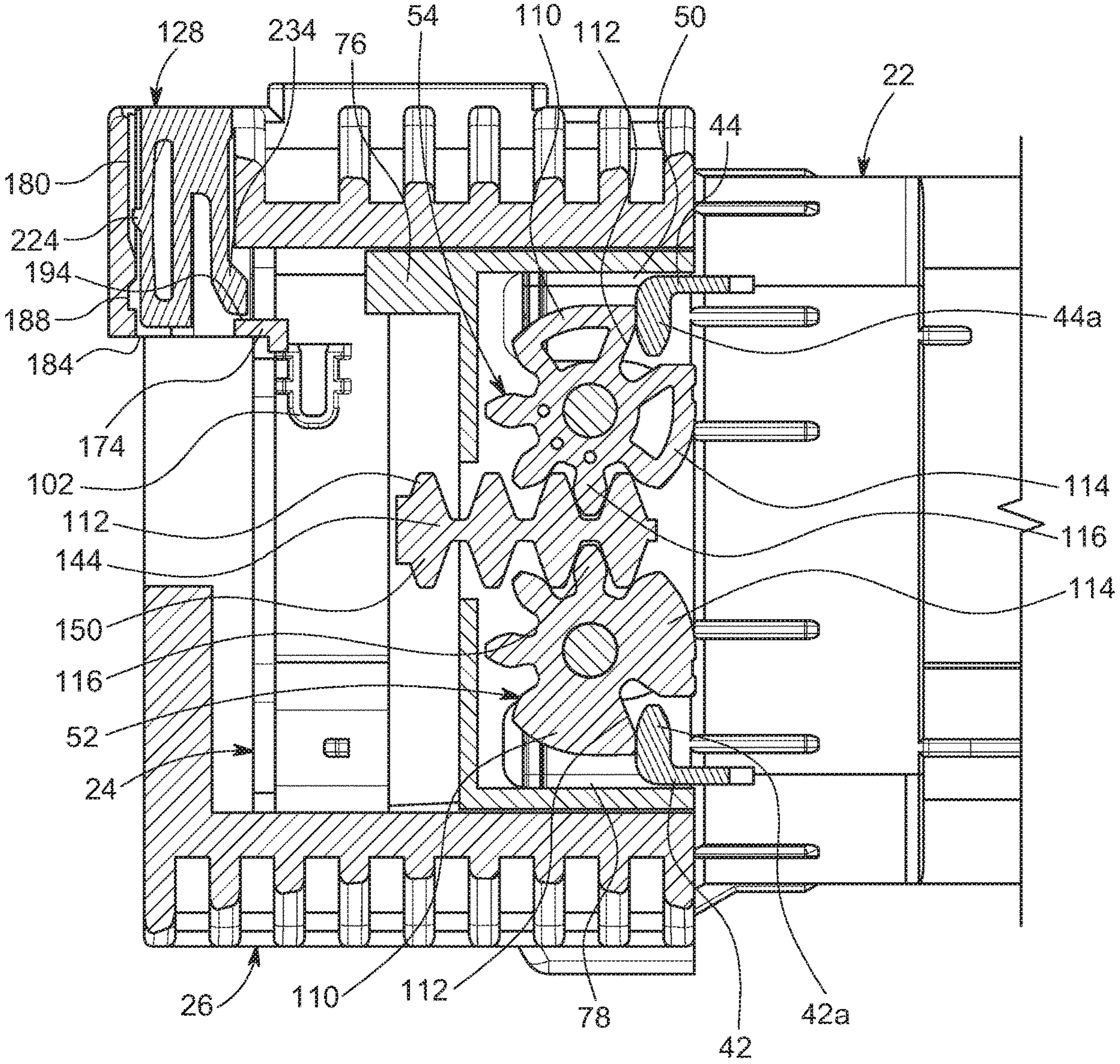
FIG. 22 depicts a cross-sectional view of the electrical connector system along line 22-22 of FIG. 1.

The coupled female connector 24 and mate assist slider 26 are pushed onto the male connector 22 with the mate assist slider 26 in the mate position of FIGS. 1, 2, 21 and 22. As shown in FIG. 21, the housing 30 of the male connector 22 enters into the recess 108 of the female connector 24, and as shown in FIG. 22, the first and second L-shaped projections 42, 44 enter into the slots 78, 80 until the first portions 42*a*, 44*a* engage with the cam surfaces 112 of the enlarged teeth 110 on the gears 52, 54. The protuberance 46 of the male connector 22 slides along the slot 92 of the female connector 24. The inner housing portion 50 of the female connector 24 enters into the cavity 32 of the male connector 22. There is no electrical contact between the electrical terminals of the male connector 22 and the female connector 24 in this position. When the coupled female connector 24 and mate assist slider 26 are continued to be pushed axially onto the male connector 22, the first portions 42*a*, 44*a* push against the cam surfaces 112 of the gears 52, 54, thereby causing the gears 52, 54 to rotate relative to the gear track 144 and draw the coupled female connector 24 and mate assist slider 26 onto the male connector 22. The male connector 22 partially seats with the recess 108 and engages with the perimeter seal 28. At this position, the passageways 36, 106 align and the electrical terminals are coupled.

Figure 23:
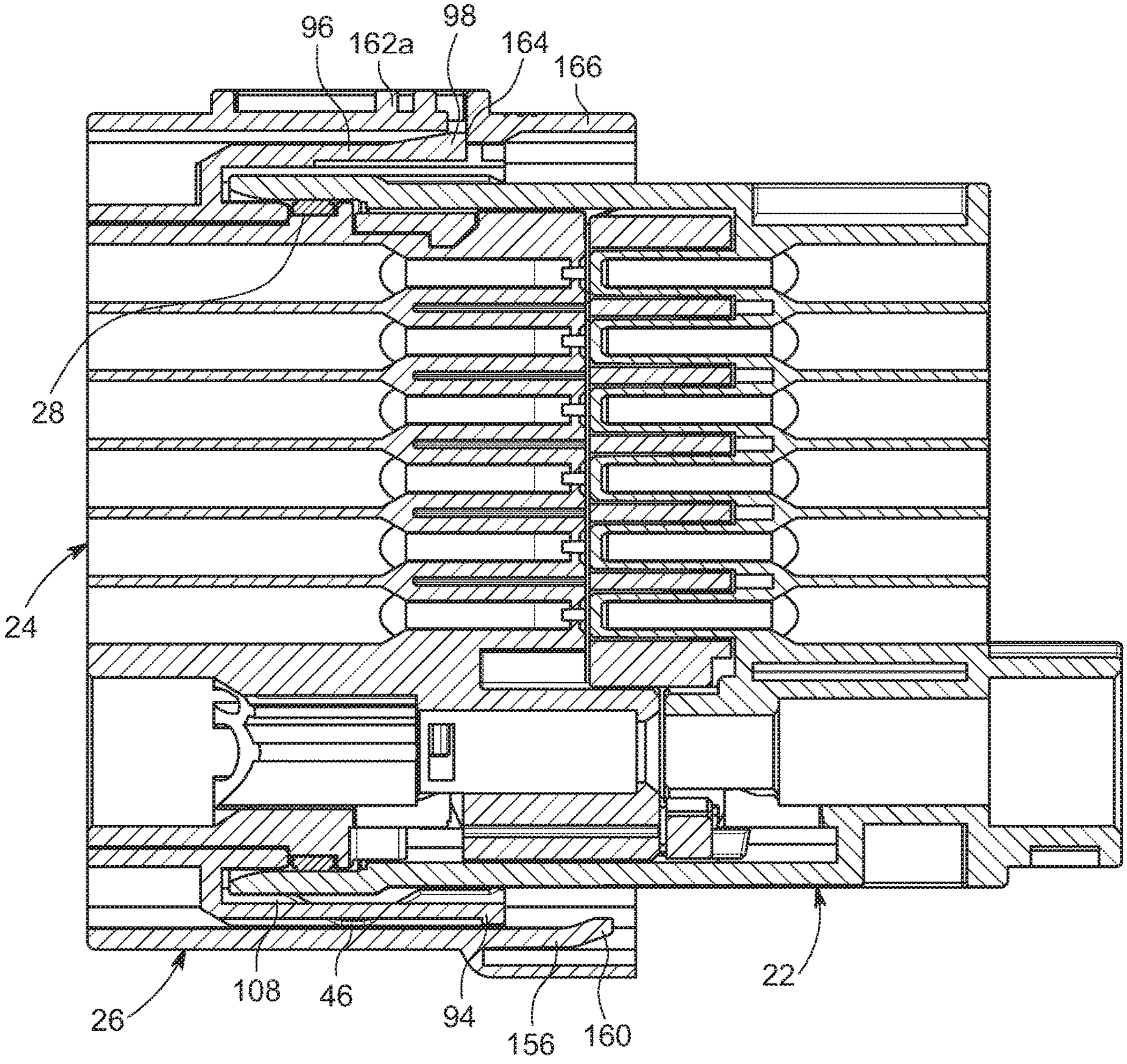
FIG. 23 depicts a cross-sectional view of the electrical connector system along line 23-23 of FIG. 5.

After the coupled female connector 24 and mate assist slider 26 are fully pushed onto the male connector 22, the finger engaging portion 162*a* of the depressible latch 162 of the mate assist slider 26 is depressed and engaged with the depressible finger 96 of the female connector 24 to move the free end 98 of the depressible finger 96 of the female connector 24 out of the pocket 166 of the shroud 126 of the mate assist slider 26. The mate assist slider 26 is then pushed relative to the female connector 24 and slides axially toward the male connector 22. The angled head portion 160 of the flexible finger 156 of the mate assist slider 26 engages with the protuberance 46 of the male connector 22 which biases the flexible finger 156 out of engagement with the protuberances 94 of the female connector 24. In the position as shown in FIG. 23, the free end 98 of the depressible finger 96 of the female connector 24 engages with the front wall surface 164 of the three-sided window of the mate assist slider 26 and the angled head portion 160 is axially past the protuberances 94. The projecting wall portion 76 of the female connector 24 enters into the opening 194 of the mate assist slider 26 and engages with the second section 234 of the second deflectable arm portion 208 of the connector position assurance device 128 to bias the second section 234 out of the opening 194. The U-shaped protrusion 102 of the female connector 24 moves rearward of the front wall 174 of the passageway 168 of the mate assist slider 26 and aligns with the opening 184.

Figure 24:
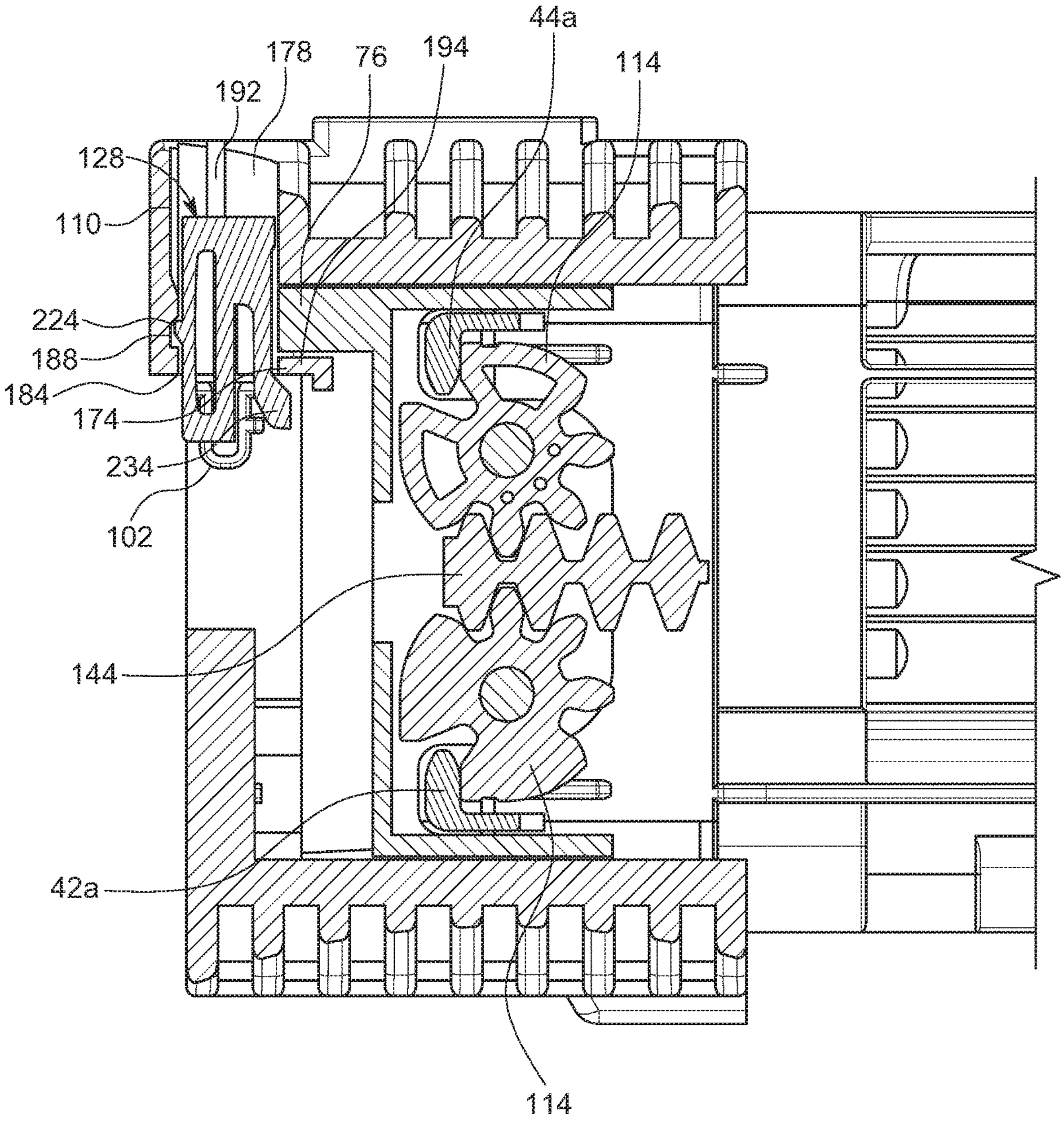
FIG. 24 depicts a cross-sectional view of the electrical connector system along line 24-24 of FIG. 5.

Next, the connector position assurance device 128 is slid relative to the shroud 126 to place the assembly in a fully locked position as shown in FIG. 24. The finger engaging portion 200 is pushed to slide the connector position assurance device 128 in the direction transverse to the axial axes 40, 82, 148. The first barb 210 slides along the elongated opening 198 to the position closest to the opposite side wall 134. When the angled wall 226 of the second barb 224 engages the angled end wall 186, the first deflectable arm portion 206 flexes to allow the second barb 224 to exit the first slot 180 and move into the recess 188. The deflected second section 234 is moved through the opening 184 and past the end of the front wall 174. The angled surface 242 of the second section 234 engages end of the front wall 174. The end of the key 204 of the connector position assurance device 128 passes through the open end 104 of the U-shaped protrusion 102 of the female connector 24 and an end portion of the key 204 seats within the U-shaped protrusion 102 while maintaining its seat within the second slot 192 of the mate assist slider 26.

To disengage the female connector 24 from the male connector 22, the finger engaging portion 200 of the connector position assurance device 128 is pulled, thereby flexing the first section 218 and allowing the barb 224 to move out of the recess 188, flexing the second section 234 toward the central spine 202 and disengaging from the end of the front wall 174, and removing the end of the key 204 from f the U-shaped protrusion 102 of the female connector 24. The finger engaging portion 200 may extend upward from the upper wall 130 of the mate assist slider 26 to allow for the operator to easy grasp the finger engaging portion 200. Thereafter, the coupled female connector 24 and the mate assist slider 26 can be pulled off of the male connector 22 in the axial direction. The male connector 22, the female connector 24, the mate assist slider and the perimeter seal 28 of the inline electrical connector system 20 can be reused.

Because two gears 52, 54, two sets of rack teeth 150, 152 and two cam surfaces 112 are provided, this provides an anti-tilt feature and stable mating between the male connector 22 and the female connector 24. The provision of the anti-tilt feature provided by the gears 52, 54, rack teeth 150, 152 and cam surfaces 112 counteracts the friction force formed as a result of the non-symmetrical passageways 36, 106 which house the electrical terminals. The force required to mate the male connector 22 and the female connector 24 is also reduced in this design.

It will be understood that there are numerous modifications of the illustrated embodiments described above which will be readily apparent to one skilled in the art, such as many variations and modifications of the compression connector assembly and/or its components including combinations of features disclosed herein that are individually disclosed or claimed herein, explicitly including additional combinations of such features, or alternatively other types of connectors. Also, there are many possible variations in the materials and configurations.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims. Further, the foregoing descriptions describe methods that recite the performance of a number of steps. Unless stated to the contrary, one or more steps within a method may not be required, one or more steps may be performed in a different order than as described, and one or more steps may be formed substantially contemporaneously. Finally, the drawings are not necessarily drawn to scale.

We claim:

1. An electrical connector system comprising:

a male connector comprising a male housing having a plurality of passageways extending in an axial direction, the male housing having first and second spaced apart projections extending from a wall thereof;

a female connector comprising a female housing having a plurality of passageways extending in an axial direction and a recess into which the male housing is configured to be seated, and first and second spaced apart rotatable gears on a wall of the female housing, wherein the first projection is configured to engage the first gear when the female connector is moved axially relative to the male connector, and the second projection is configured to engage the second gear when the female connector is moved axially relative to the male connector; and a mate assist slider comprising a shroud having a passageway therethrough, the shroud having a gear track on a wall thereof which extends into the passageway thereof, wherein the female connector seats within the passageway of the mate assist slider and the gear track mates with the first and second rotatable gears, wherein axial movement of the female connector and mate assist slider relative to the male connector causes engagement of the first and second projections with the first and second gears, thereby causing the first and second gears to rotate relative to the gear track and draw the female connector and mate assist slider onto the male connector.

2. The electrical connector system of claim 1, wherein the gear track has a central spine that extends axially along the shroud, a plurality of first teeth extending from a first side of the spine, and a plurality of second teeth extending from a second side of the spine, wherein the first teeth engage with the teeth of the first gear and the second teeth engage with the teeth of the second gear.

3. The electrical connector system of claim 2, wherein the central spine is axially aligned with an axial axis of the mate assist slider and an axial axis of the female connector.

4. The electrical connector system of claim 2, wherein each gear has a plurality of teeth, wherein one of the teeth of each gear has a cam surface thereon, and wherein the first projection engages with the cam surface of the first gear and the second projection engages with the cam surface of the second gear.

5. The electrical connector system of claim 4, wherein each projection has a first portion that is perpendicular to an axial axis of the female connector and a second portion that is parallel to the axial axis of the female connector, wherein the first portion of the first projection engages with the cam surface of the first gear and the first portion of the second projection engages with the cam surface of the second gear.

6. The electrical connector system of claim 5, wherein the gear track has a central spine that extends axially along the shroud, and a plurality of first teeth extending from a first side of the spine, and a plurality of second teeth extending from a second side of the spine, wherein the first teeth engage with the teeth of the first gear and the second teeth engage with the teeth of the second gear.

7. The electrical connector system of claim 2, wherein the female connector and the mate assist slider have cooperating lock features configured to prevent movement of the mate assist slider relative to the female connector, wherein the lock features can be released to allow movement of the mate assist slider relative to the female connector.

8. The electrical connector system of claim 1, wherein each gear has a plurality of teeth, wherein one of the teeth of each gear has a cam surface thereon, and wherein the first projection engages with the cam surface of the first gear and the second projection engages with the cam surface of the second gear.

9. The electrical connector system of claim 1, wherein an axis of rotation of each gear is equidistantly spaced from an axial axis of the female connector.

10. The electrical connector system of claim 1, wherein the shroud includes walls forming an open ended passageway, wherein one of the walls has an opening therethrough which is in communication with the passageway of the shroud; and wherein the mate assist slider further comprises a connector position assurance device mounted within the passageway of the shroud, the connector position assurance device including a finger engaging portion, and a deflectable arm portion extending from the finger engaging portion, wherein the deflectable arm portion is positionable within the opening to prevent movement of the connector position assurance device relative to the shroud.

11. The electrical connector system of claim 10, wherein the female connector includes a wall portion projecting from a rear end thereof which is configured to pass through the opening and engage the deflectable arm portion.

12. The electrical connector system of claim 10, wherein the connector position assurance device further includes a spine extending from the finger engaging portion, the deflectable arm portion being moveable relative to the spine, and wherein a portion of the spine seats within a slot in one of the walls of the shroud.

13. The electrical connector system of claim 12, wherein the female connector includes a wall which is configured to receive an end of the spine.

14. The electrical connector system of claim 10, wherein the female connector and the mate assist slider have cooperating lock features configured to prevent movement of the mate assist slider relative to the female connector, wherein the lock features can be released to allow movement of the mate assist slider relative to the female connector.

15. The electrical connector system of claim 10, wherein the gear track has a central spine that extends axially along the shroud, a plurality of first teeth extending from a first side of the spine, and a plurality of second teeth extending from a second side of the spine, wherein the first teeth engage with the teeth of the first gear and the second teeth engage with the teeth of the second gear.

16. The electrical connector system of claim 15, wherein each gear has a plurality of teeth, wherein one of the teeth of each gear has a cam surface thereon, and wherein the first projection engages with the cam surface of the first gear and the second projection engages with the cam surface of the second gear.

17. The electrical connector system of claim 1, wherein the female connector and the mate assist slider have cooperating lock features configured to prevent movement of the mate assist slider relative to the female connector, wherein the lock features can be released to allow movement of the mate assist slider relative to the female connector.

18. The electrical connector system of claim 17, wherein the cooperating lock features comprises a depressible finger of the female connector which engages with a wall on the mate assist slider, and wherein the mate assist slider includes a depressible latch which engages with the depressible finger to release the depressible finger from engagement with the wall on the mate assist slider.

19. The electrical connector system of claim 18, wherein the cooperating lock features further comprises a flexible finger of the female connector which engages with a protuberance on the mate assist slider, and wherein the male connector includes a protuberance which engages with the flexible finger to release the flexible finger from engagement with the protuberance on the mate assist slider.

20. The electrical connector system of claim 17, wherein the cooperating lock features comprises a flexible finger of the female connector which engages with a protuberance on the mate assist slider, and wherein the male connector includes a protuberance which engages with the flexible finger to release the flexible finger from engagement with the protuberance on the mate assist slider.

21. The electrical connector system of claim 1, wherein the wall of the female connector includes first and second elongated slots, wherein the first projection of the male connector extends through the first slot, and the second projection of the male connector extends through the second slot.

22. The electrical connector system of claim 21, wherein each projection is L-shaped.

* * * * *